United States Patent
Kaneko et al.

(10) Patent No.: US 7,961,352 B2
(45) Date of Patent: Jun. 14, 2011

(54) PRINTING CONTROL ACCORDING TO COMBINATIONS OF COLOR MATERIALS

(75) Inventors: Nao Kaneko, Suwa (JP); Yoshifumi Arai, Shiojiri (JP); Takashi Ito, Naganoken (JP)

(73) Assignee: Seiko Epson Corporation, Tokyo (JP)

( * ) Notice: Subject to any disclaimer, the term of this patent is extended or adjusted under 35 U.S.C. 154(b) by 608 days.

(21) Appl. No.: 12/077,705

(22) Filed: Mar. 19, 2008

(65) Prior Publication Data
US 2008/0246982 A1    Oct. 9, 2008

(30) Foreign Application Priority Data

Mar. 20, 2007  (JP) .................................. 2007-072829
Mar. 20, 2007  (JP) .................................. 2007-072831
Sep. 26, 2007  (JP) .................................. 2007-249944

(51) Int. Cl.
H04N 1/60   (2006.01)
G03F 3/08   (2006.01)
G06K 9/00   (2006.01)

(52) U.S. Cl. .......... 358/1.9; 358/518; 382/162; 382/167

(58) Field of Classification Search .................. 358/1.9, 358/518, 530, 529, 520, 523, 524, 525; 382/162, 382/167; 347/43, 19, 14, 7
See application file for complete search history.

(56) References Cited

U.S. PATENT DOCUMENTS

| 7,706,604 B2 * | 4/2010 | Berns et al. .................. 382/162 |
| 2005/0083346 A1 | 4/2005 | Takahashi et al. |
| 2005/0094169 A1 | 5/2005 | Berns et al. |
| 2006/0044346 A1 | 3/2006 | Hakamada |
| 2006/0276978 A1 | 12/2006 | Yamamoto et al. |

FOREIGN PATENT DOCUMENTS

| JP | 2002-247403 | 8/2002 |
| JP | 2006-082460 | 3/2006 |
| JP | 2006-197080 | 7/2006 |
| JP | 2006-334945 | 12/2006 |

OTHER PUBLICATIONS

R. Balasubramanian, "Optimization of the Spectral Neugebauer Model for Printer Characterization," *J. Electron. Imaging*, vol. 8(2), (1999), pp. 156-166.

D. R. Wyble and R.S. Berns, "A Critical Review of Spectral Models Applied to Binary Color Printing," *Color Res. Appl.*, vol. 25, No. 1, (Feb. 2000), pp. 4-19.

R. S. Berns, *Billmeyer and Saltzman's Principles of Color Technology*, 3rd Ed., John Wiley & Sons, Inc., (2000), pp. 129 and 213-215.

(Continued)

*Primary Examiner* — Charlotte M Baker
(74) *Attorney, Agent, or Firm* — Martine Penilla & Gencarella, LLP

(57) ABSTRACT

A printing control device which performs printing control for printing by using color materials of a plurality of types, includes: acquiring unit that acquires a color material set which is a combination of the color materials used for printing; and creation unit that creates a color conversion profile which prescribes conversion rules for converting image data expressed by a first color space into image data expressed by a second color space which differs from the first color space and which is a color space expressed by a color material amount set which is a combination of usage amounts for the respective color materials constituting the color material set.

15 Claims, 29 Drawing Sheets

OTHER PUBLICATIONS

N. Moroney et al., "The CIECAM02 Color Appearance Model," *Proc. IS&T/SID Tenth Color Imaging Conf.*, (2002), pp. 23-27.

C. Li et al., "The Performance of CIECAM02," *Proc. IS&T/SID Tenth Color Imaging Conf.*, (2002), pp. 28-32.

Abstract of Japanese Patent Publication No. 2006-082460, Pub. Date: Mar. 30, 2006, Patent Abstracts of Japan.

Abstract of Japanese Patent Publication No. 2006-107080, Pub. Date: Jul. 27, 2006, Patent Abstracts of Japan.

Abstract of Japanese Patent Publication No. 2002-247403, Pub. Date: Aug. 30, 2002, Patent Abstracts of Japan.

Abstract of Japanese Patent Publication No. 2006-334945, Pub. Date: Dec. 14, 2006, Patent Abstracts of Japan.

M. Fujino, "Image Quality Evaluation of Inkjet Prints," *Japan Hardcopy '99* (1999), pp. 291-294 (with English translation).

* cited by examiner

SPECTRAL REFLECTIVITY DATA

| INK AMOUNT SET | SPECTRAL REFLECTIVITY |
|---|---|
| C,M,Y,K,lc,lm,lk,llk,dy,R,B,O,G | λ =320 330 ··· 840(nm) |
| 0,0,0,0,0,0,0,0,0,0,0,0 | 100 100 ··· 100 |
| 51,0,0,0,0,0,0,0,0,0,0,0 | |
| 102,0,0,0,0,0,0,0,0,0,0,0 | |
| | |
| | |
| | |
| | |
| | |

CM INK AMOUNT PLANE

FIG. 15
(A) SPECTRAL NEUGEBAUER MODEL
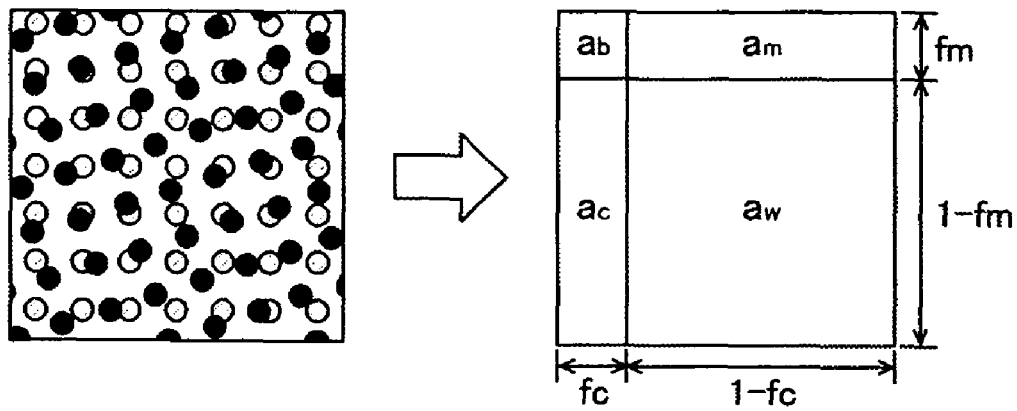
$$R(\lambda) = a_w R_w(\lambda) + a_c R_c(\lambda) + \cdots + a_k R_k(\lambda)$$
$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m)f_y$$
$$a_r = (1 - f_c)f_m f_y$$
$$a_g = f_c(1 - f_m)f_y$$
$$a_b = f_c f_m(1 - f_y)$$
$$a_k = f_c f_m f_y$$
(B) MURRAY-DAVIS MODEL
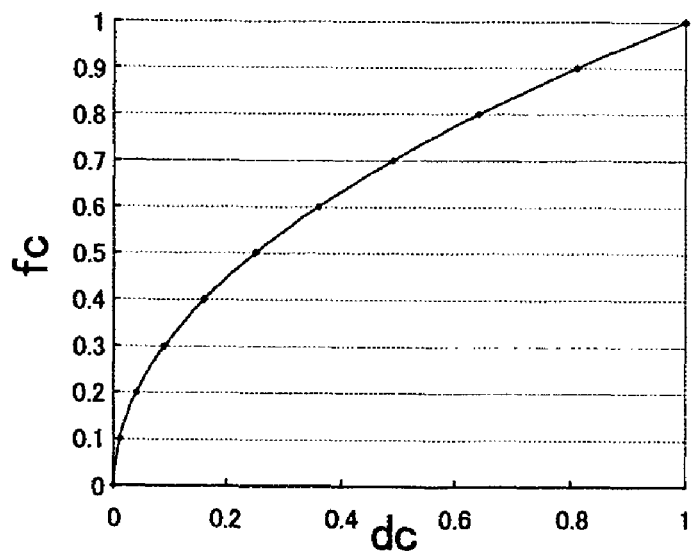
$$f_c = f_{1D-LUT}(d_c)$$

FIG. 16
(A) CELL DIVISION YULE-NIELSON SPECTRAL NEUGEBAUER MODEL
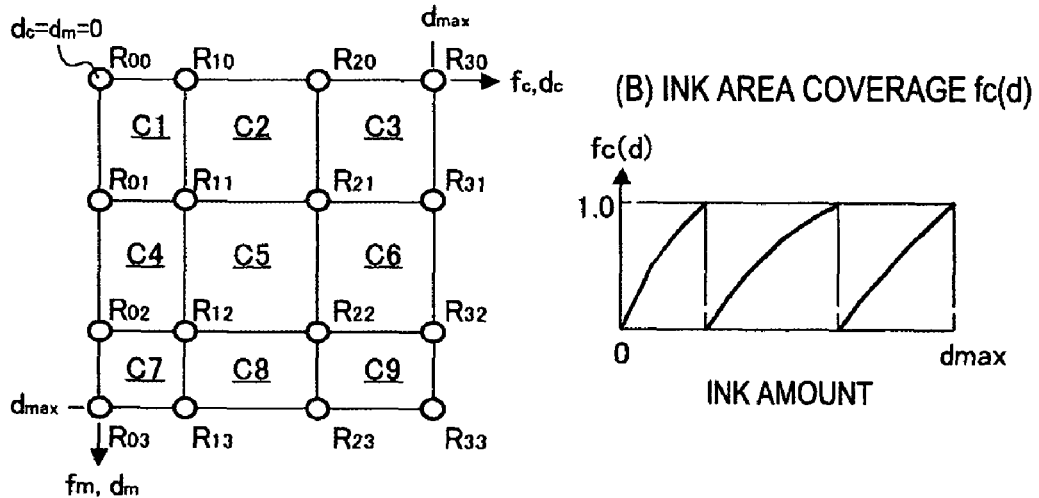
(B) INK AREA COVERAGE fc(d)
(C) CALCULATION OF SPECTRAL REFLECTIVITY $R(\lambda)$
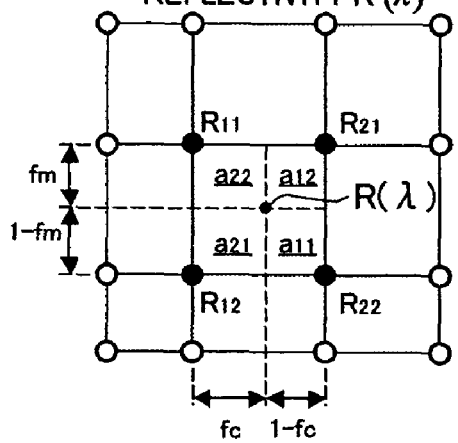
$$R(\lambda) = \left(\sum a_i R_i(\lambda)^{1/n}\right)^n$$
$$= \left(a_{11} R_{11}(\lambda)^{1/n} + a_{12} R_{12}(\lambda)^{1/n} + a_{21} R_{21}(\lambda)^{1/n} + a_{22} R_{22}(\lambda)^{1/n}\right)^n$$
$$a_{11} = (1 - f_c)(1 - f_m)$$
$$a_{12} = (1 - f_c) f_m$$
$$a_{21} = f_c (1 - f_m)$$
$$a_{22} = f_c f_m$$

FIG. 19
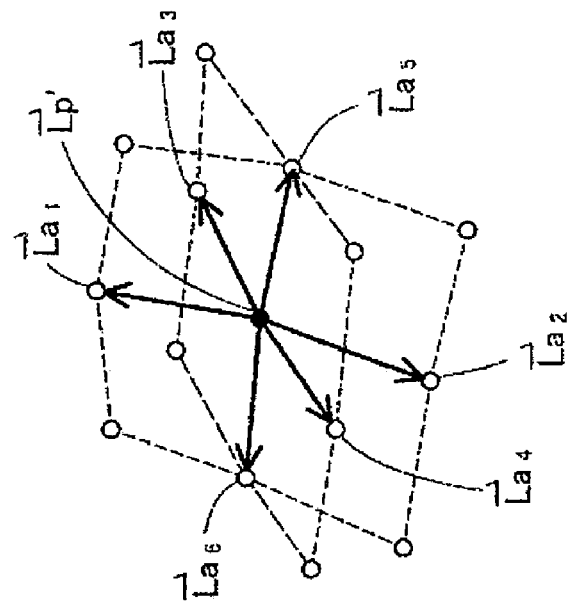
B
$$SI = |(\vec{L}a_1 - \vec{L}p) + (\vec{L}a_2 - \vec{L}p)| \\ + |(\vec{L}a_3 - \vec{L}p) + (\vec{L}a_4 - \vec{L}p)| \\ + |(\vec{L}a_5 - \vec{L}p) + (\vec{L}a_6 - \vec{L}p)|$$
→ MINIMIZATION
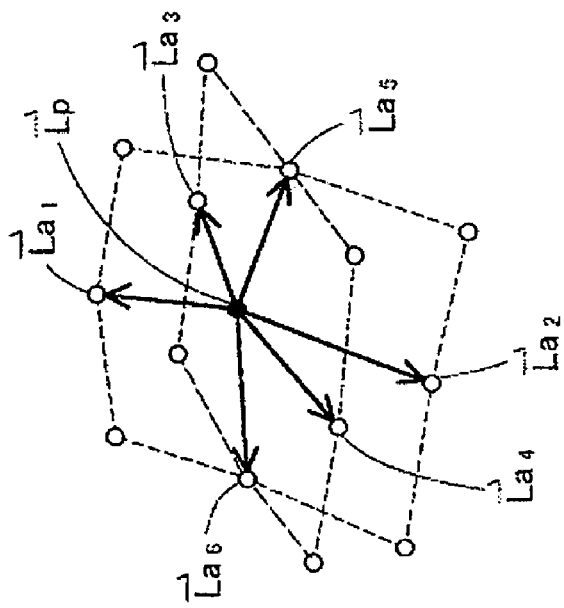
A

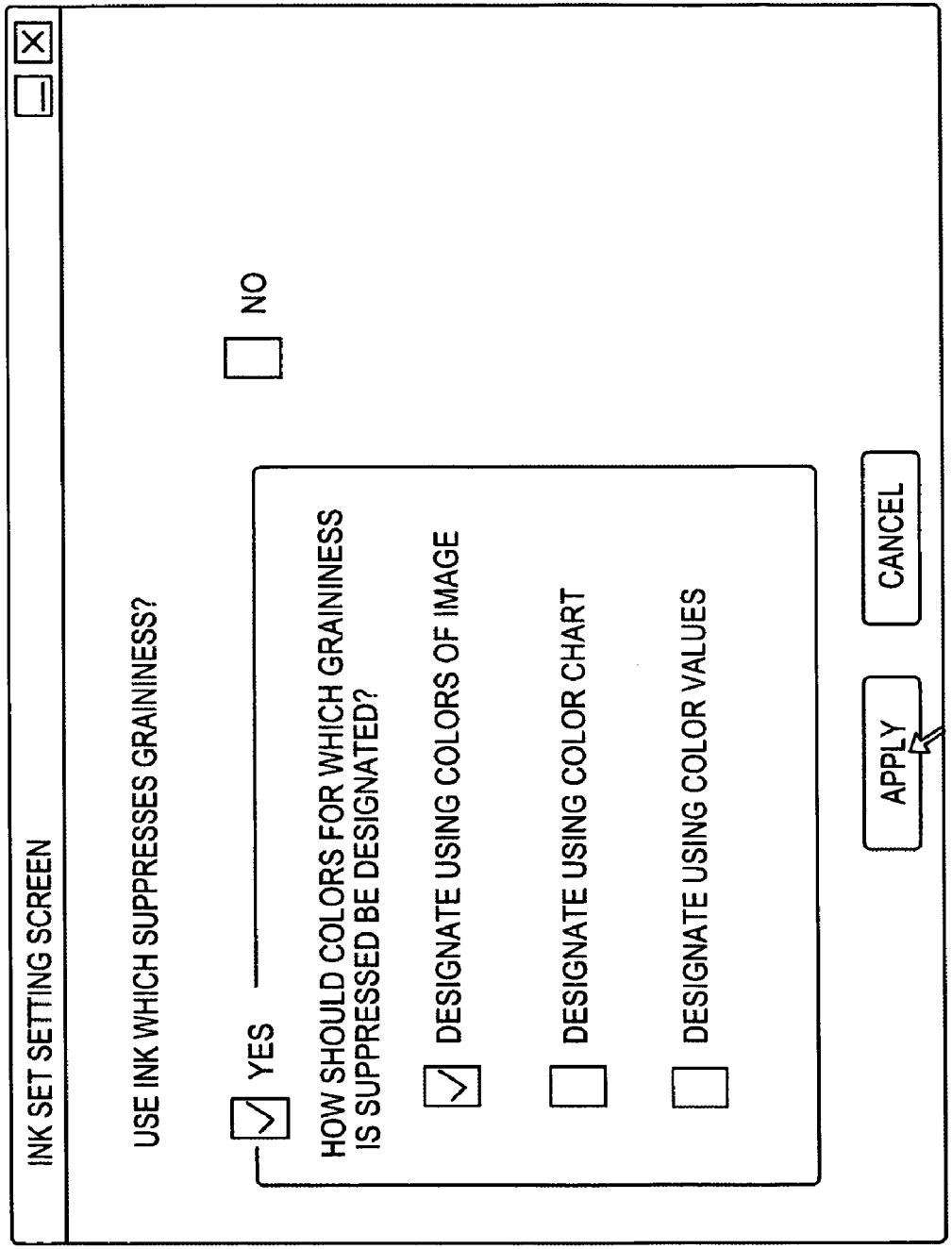

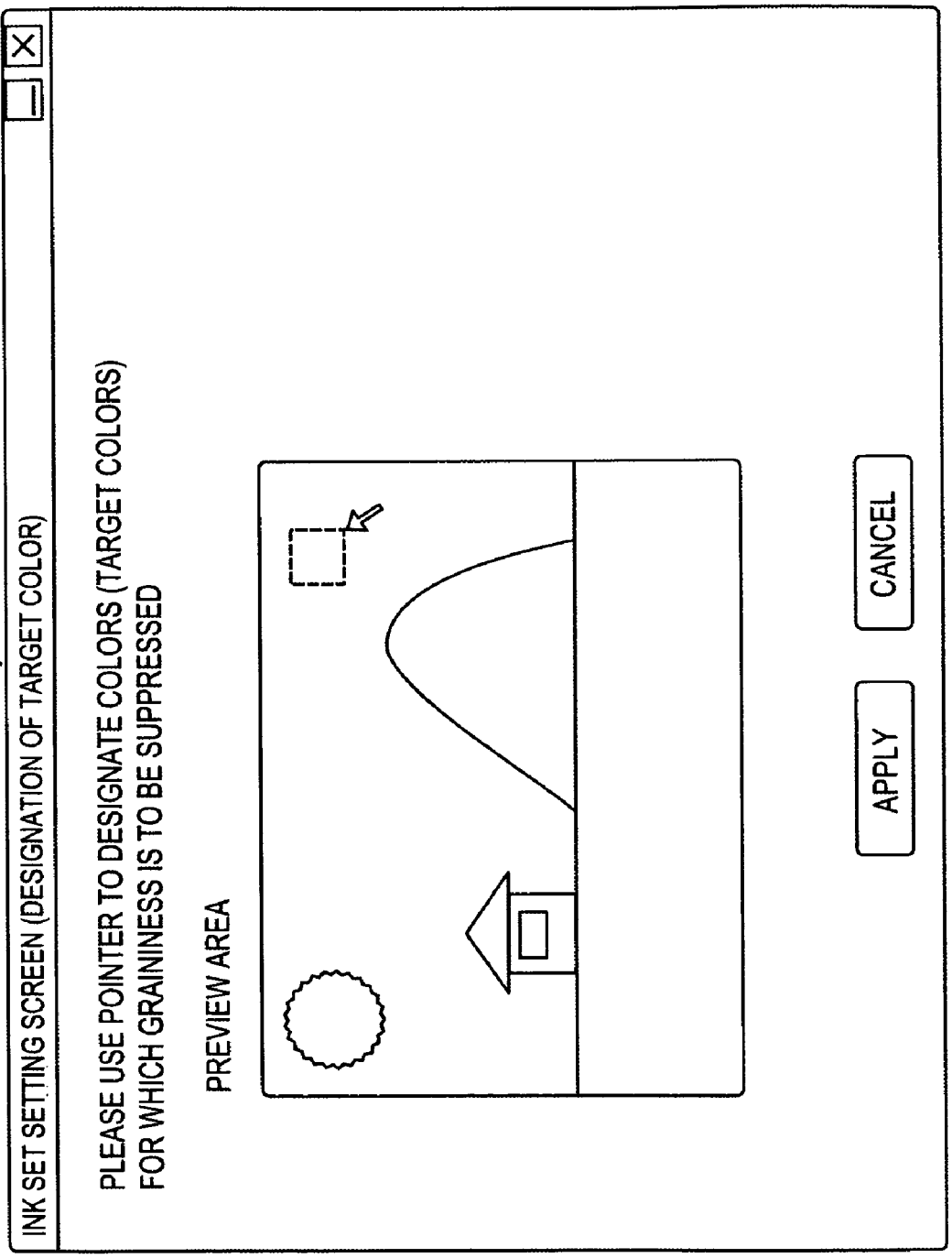

FIG. 26

INK SET SETTING SCREEN (DESIGNATION OF RESTRICTIONS)

DOES INK WHICH IS TO BE USED EXIST?

☑ YES

- ☐ CYAN INK (C)
- ☐ MAGENTA INK (M)
- ☐ YELLOW INK (Y)
- ☑ BLACK INK (K)
- ☐ ORANGE INK (O)
- ☐ RED INK (R)
- ☐ GREEN INK (G)
- ☐ LIGHT MAGENTA INK (lm)
- ☐ LIGHT CYAN INK (lc)
- ☐ GRAY INK (lk)
- ☐ LIGHT GRAY INK (llk)
- ☐ BLUE INK (B)
- ☐ DARK YELLOW INK (dy)

DOES INK WHICH SHOULD NOT BE USED EXIST?

☑ YES

- ☐ CYAN INK (C)
- ☐ MAGENTA INK (M)
- ☐ YELLOW INK (Y)
- ☐ BLACK INK (K)
- ☐ ORANGE INK (O)
- ☐ RED INK (R)
- ☐ GREEN INK (G)
- ☐ LIGHT MAGENTA INK (lm)
- ☐ LIGHT CYAN INK (lc)
- ☑ GRAY INK (lk)
- ☑ LIGHT GRAY INK (llk)
- ☐ BLUE INK (B)
- ☑ DARK YELLOW INK (dy)

[APPLY] [CANCEL]

FIG. 27

| INK AMOUNT SETS WITH WHICH TARGET COLORS CAN BE REPRODUCED $(d_c, d_m, d_y, d_k, d_{lc}, d_{lm}, d_{lk}, d_{llk}, d_{dy}, d_r, d_o, d_g, d_b)$ | GRAININESS INDEX | INK SET WHICH CAN BE PROVIDED |
|---|---|---|
| (5, 3, 2, 1, 18, 15, 0, 0, 0, 0, 0, 3, 1) | 0.15 | CMYKGBlclm |
| (5, 5, 2, 1, 20, 18, 0, 0, 0, 0, 0, 0, 0) | 0.11 | CMYKlclm, CMYKRlclm, CMYKROlclm······ |
| (8, 4, 2, 1, 0, 18, 0, 0, 0, 0, 3, 3, 3) | 0.2 | CMYKOGBlc |
| (10, 12, 4, 5, 0, 0, 0, 0, 0, 0, 0, 0, 0) | 0.4 | CMYK, CMYKlc, CMYKlm, CMYKO······ |
| ······ | ······ | |

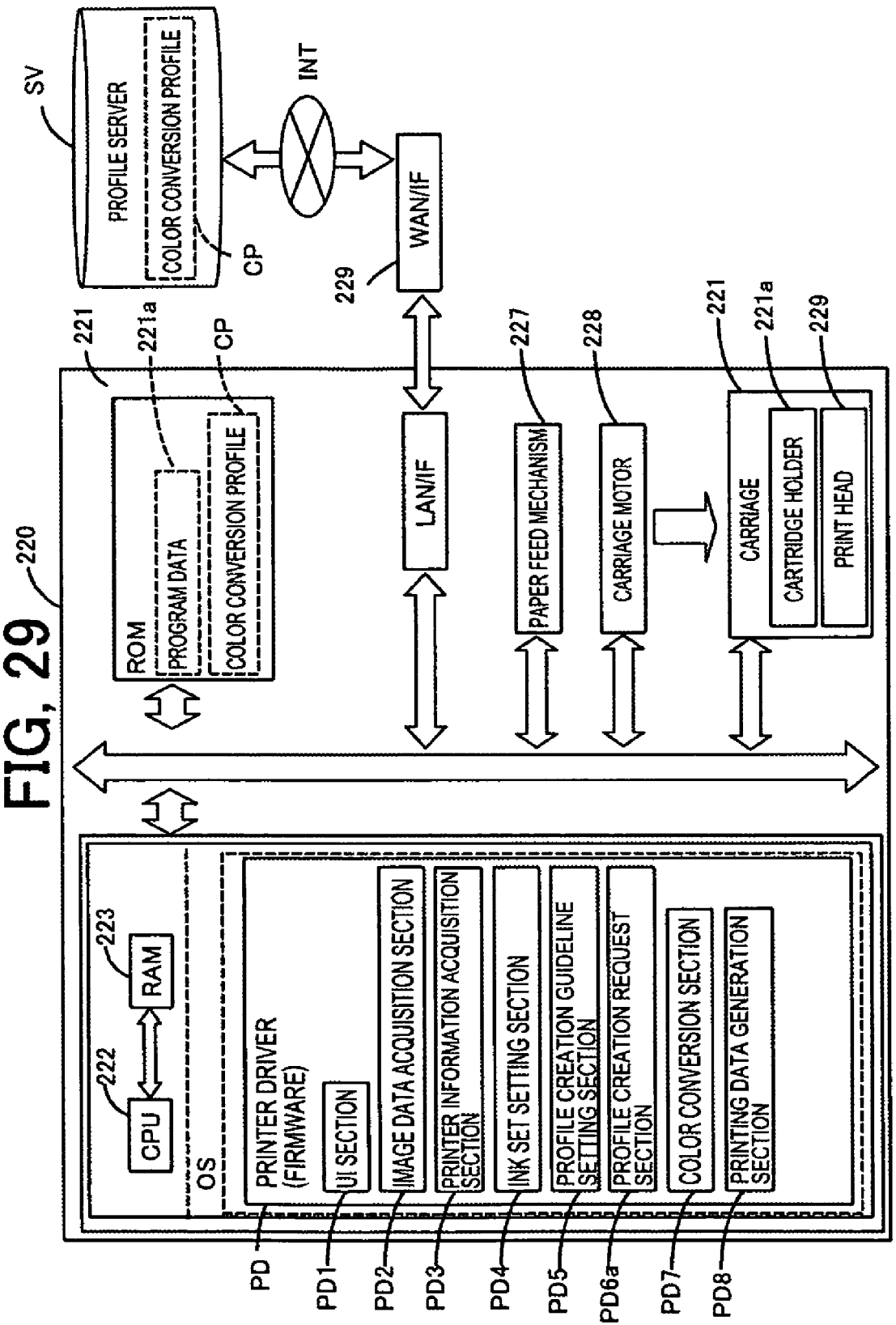

PRINTING CONTROL ACCORDING TO COMBINATIONS OF COLOR MATERIALS

The entire disclosure of Japanese Patent Application No. 2007-072829 filed Mar. 20, 2007, Japanese Patent Application No. 2007-072831 filed Mar. 20, 2007, Japanese Patent Application No. 2007-249944 filed Sep. 26, 2007, Japanese Patent Application No. 2005-5072 filed Jan. 12, 2005, and US Application No. 2006/176529 filed Jan. 9, 2006, are expressly incorporated by reference herein.

BACKGROUND

1. Technical Field

The present invention relates to printing control according to combinations of color materials.

2. Related Art

In recent years, there has been a trend toward an increase in the types of ink which can be used by domestic printers. This is because, by making combined usage of ink of a greater number of types, it is possible to implement a wide color reproduction gamut in which the colors unique to the color materials of each ink are utilized. However, there are also those users who prioritize printing using as few types of inks as possible over implementing a wide color reproduction gamut. For example, in order to print text in which the color reproduction gamut is unimportant with a printer in which six inks are installed, a situation where users must purchase all six inks especially also arises. The selection of the print quality required by the user is implemented to a certain degree through the selection of the printer model (the selection of a model in which four inks are installed or a model in which six inks are installed, for example). However, a model which individually satisfies the needs of an unspecified number of users is practically impossible for all the printer manufacturing sources to provide. Furthermore, changes in the application of the printer after the printer is purchased by a single user may also be considered and it is also possible to consider the subsequent arrival of a situation where it is necessary to prepare ink in order to implement the print quality which the user does not currently require.

However, a technology which presents and switches combinations of inks which have a color reproduction gamut which covers the color gamut represented by the image data of a print target has been proposed (See Japanese Patent Application Laid Open No. 2006-82460). With a constitution of this kind, ink which is suitable for the printing of the image data of the print target can be used in printing.

However, in cases where the ink used for printing is dynamically changed in accordance with the image data of the print target, printing cannot be performed merely by installing ink that has actually changed in the printer. This is because, in order to ultimately drive the printer head in accordance with the image data of the print target, a color conversion profile which prescribes the conversion rules for converting the image data of the print target into image data for the ink amounts of the changed ink is required. In Japanese Patent Application Laid Open No. 2006-82460, the printing control section 18 (See paragraph [0005] of Japanese Patent Application Laid Open No. 2006-82460) may be considered to fulfill this function but it is not clear what kind of color conversion profile is being used. For example, although a procedure that prepares an infinite color conversion profile which corresponds with all ink combinations may also be considered in anticipation of all ink combinations, the color conversion profile prescribes the rules for conversion between a color space and an ink amount space and there is a large amount of data. Hence, this procedure is not practical in particular if there are a large number of combinations of inks which can be used. Therefore, even when an ink set which is capable of implementing a favorable color reproduction gamut exists, there has been the problem that color conversion which flexibly corresponds with the ink set cannot be performed. In addition, the needs of the user with respect to the print result is not limited to the color reproduction gamut and there has been a need for the flexible use of an ink set which is favorable for another print performance.

SUMMARY

According to an aspect of the invention, a color material set which is a combination of the above color materials which the acquiring means use for the printing is first acquired when exercising printing control for performing printing by means of color materials of a plurality of types. That is, information on what kind of combination of color materials (color material set) is used is acquired when performing printing from that point onward. The color materials are materials which produce a predetermined color (spectral reflectivity) when same adhere to the recording medium, and correspond to liquid ink, ink ribbon, or powder ink (toner) or the like. The creation means creates a color conversion profile which prescribes conversion rules for converting image data expressed by a first color space into image data expressed by a second color space which differs from the first color space and which is a color space expressed by a color material amount set which is a combination of usage amounts for the respective color materials constituting the color material set, in accordance with the color material set. As a result, even when the optional color material set is acquired, the creation of a color conversion profile and color conversion which correspond with the color material set can be implemented. 'Color material set' signifies a combination of color material types and 'color material amount set' signifies a combination of color material amounts which are used for printing.

The most important factor when creating the color conversion profile is that isochromatism be maintained before and after the color conversion. However, the color conversion profile can also be created by also considering other elements. That is, when the color conversion profile is created, conversion rules such that the color material amount set after the color conversion satisfies a predetermined first print performance may be prescribed. The first print performance should be diversified and the integration of a plurality of performance elements of different perspectives is desirable. This is because, in cases where a first performance element is preferred and another performance element is very bad, a printing result which satisfies the user is not obtained.

As a specific example of a performance element, a performance which represents the tonality of the printed matter, a performance which represents the graininess of the printed matter, a performance which represents the constancy of the print color and the amount of color material consumed during printing, and a performance which represents a color reproduction gamut, for example, can be adopted. Thus, by performing color conversion by using the color conversion profile, printing with which these performances satisfy predetermined conditions can be implemented. An integrated first print performance rendered by combining a few of these performances may be satisfied or all of the performances may be combined. Naturally, an integrated first print performance obtained by combining performance elements representing perspectives other than these performances may also be satisfied. In addition, when the respective performance elements are integrated to create the first print performance, the degree of importance of the respective performance elements can be adjusted. Because there are no restrictions on the act of always uniformly requesting the respective performance elements, the optimum degree of importance is desirably adjusted in accordance with the print status, for example.

However, as a specific example of a method in which acquiring means acquires a color material set which is a combination of the color materials used for printing, the color material set may be acquired on the basis of the installation status, in a printing device, of the color material containers which contain the color materials, for example. This is because there is thought to be a high probability that the combination of color materials with which the color material containers are installed in the printing device is the color material set which will actually be used for printing. However, even when this combination of color materials is actually installed in the printing device, cases where the user has no desire to perform printing by using all of the color materials which correspond with the installed color containers may also be considered. Hence, the color materials which are designated by the user may be acquired as the color materials set used for printing.

In addition, as another specific example of a method in which acquiring means acquires a color material set which is a combination of the color materials used for printing, the request receiving means receives a request for a second print performance. Further, the selecting means estimates the print performance when printing is performed by means of the respective color material sets constituted by a combination of the color materials and selects the color material set which satisfies the request on the basis of the estimate. As a result, printing can be performed by using the color material set that satisfies the second print performance thus requested.

Furthermore, when the selecting means selects the color material set, the selecting means may receive restrictions for the color material set used for printing and select the color material set within these restrictions. For example, the selecting means may receive the color materials and so forth which are to be used invariably as the restrictions, and a color material set which includes these color materials may be selected.

In addition, as a specific example of the above request, the fact that a predetermined color reproduction gamut is to be secured may be received as the request. In this case, color reproduction gamut data which hold information on the color reproduction gamut in cases where printing is performed by means of respective color material sets which are combinations of the color materials that can be used by the printing device may be prepared. In cases where color material inks are considered, for example, when printing is performed by means of a particular combination of inks (an ink set), data indicating to what extent the color reproduction gamut can be reproduced are stored in each ink set. Further, when the image data of the print target are printed, a color material set which possesses a color reproduction gamut which is suitable for printing the image data is selected by means of the color reproduction gamut data. Hence, by performing color conversion by using the color conversion profile thus created, printing which allows a color reproduction gamut which is suitable for the printing of the image data of the print target to be reproduced can be carried out. That is, even when the color material set used for printing is dynamically changed in accordance with the image data, printing can be performed by utilizing the color conversion profile in correspondence with the color material set.

There are also cases where the work to place the color material in a usable state must be carried out by the user. For example, in the case of a general inkjet printer, the ink to be used cannot be changed unless the user exchanges an ink cartridge. Hence, notification means are also provided and, as a result of reporting the color material set, the user is urged to replace the color material.

Furthermore, a variety of judgment standards for determining whether the color material set is a color material set which possesses a color reproduction gamut which is suitable for printing the image data of the print target can be adopted. For example, if the color material set is a color material set which possesses a color reproduction gamut in which all of the colors represented by the image data of the print target are included, because all of the colors of the image data can be reproduced, it can be judged that the color material set is suitable. Furthermore, a comparison with the color reproduction gamut for the colors represented by the image data of the print target is not carried out and the color material set which possesses a suitable color reproduction gamut may also be judged in accordance with the attributes of the image data, for example. For example, it may be judged whether the color material set is the color material set which possesses a suitable color reproduction gamut based on whether the image data represent a document or a photograph.

In addition, a case where any of the color material sets are already placed in a usable state in the printing device when printing is carried out may also be considered. In such a case, the color material set which is in a usable state may be acquired and a warning may be issued in cases where the color material set does not possess a color reproduction gamut which is suitable for printing the image data of the print target. In addition, a case where the color material set which the user would like to use is designated when printing is performed may also be considered. In such a case, a warning may be issued in cases where the color material set which the user has designated for use in the printing does not possess a color reproduction gamut which is suitable for printing the image data of the print target. In addition, notification of the suitable color material set may be sent together with this warning. Moreover, it may be confirmed whether a suitable color reproduction gamut can be reproduced for the color conversion profile thus created. The color conversion profile is created with a suitable color reproduction gamut as the target but the creation of a color reproduction gamut while same is in an impaired state as a result of prioritizing another target (image quality or the like, for example) may also be considered. Hence, the verification of the color reproduction gamut of the color conversion profile thus created is desirable.

In addition, as a specific example of the abovementioned request, the act of suppressing graininess may also be received as the request. In this case, the selecting means selects the color material set which satisfies the request on the basis of a pre-prepared graininess estimate model. That is, by executing an estimate of the graininess for each color material set on the basis of a graininess estimate model, a color material set which permits graininess suppression can be selected. In addition, the act of suppressing the graininess for a specified target color may be accepted as the request. As a result, printing which suppresses the graininess of a target color for which graininess is particularly worrisome can be performed.

Furthermore, where the specific method of designating the target color is concerned, the target color may be acquired on the basis of a color indicated by a designated color value, a color indicated by a designated color patch, or a color indicated by an area which is designated by a displayed image. The target color can be intuitively designated according to the color indicated by the designated color patch or the color indicated by an area which is designated by a displayed image or the target color can be designated strictly according to the color indicated by the designated color value.

Furthermore, when the color material set which suppresses graininess for the target color is selected on the basis of graininess estimate model, it is necessary to confirm whether the color material set is a color material which allows the target color to be reproduced. This is because the request cannot be satisfied unless the color material set is a color material set which exhibits favorable graininess and permits the target color to be reproduced. Hence, the color material amount set which allows the target color to be reproduced is specified on the basis of the color estimate model and the color material set which suppresses graininess the most is specified, on the basis of the graininess estimate model, from among the specified color material amount sets. The color material set which allows the color material amount set which suppresses graininess the most to be provided is then selected. Furthermore, the color material set which allows the target color to be reproduced may be specified beforehand and the optimal color material amount set may be specified by using an evaluation index which simultaneously evaluates the proximity to the target color and the degree of graininess suppression.

In addition, the color conversion profile prescribes the conversion rules for basically maintaining an isochromatic relationship and it is virtually essential to grasp the colors in a case where printing is carried out by means of the respective color material amount sets in the creation of the color conversion profile. Hence, although it is necessary to print a color patch by means of each color material amount set and perform color measurement on the respective color patches, a general user is not thought to have a colorimeter and it is not realistic. Therefore, the printing/colorimetry of the color patch is not actually performed and, by estimating the colors in a case where printing is performed by means of each color material amount set, the color conversion profile which corresponds with an optional color material set can be created in an environment where there the user does not possess a colorimeter.

Further, although colors may also be estimated directly from the respective color material amount sets in the color estimate, the spectral reflectivity may also be estimated once from the respective color material amount sets or the colors when irradiating a predetermined light source may be estimated from the spectral reflectivity. The color conversion profile which corresponds with the observation light source of the printed matter can also be created in this manner. The data which form the basis of the estimate are required at the time of the estimate. For example, if a database which is used in the estimate of the spectral reflectivity (a color estimate model or graininess estimate model or the like which recommends the inks that can be provided) is prepared for each of the color material sets, the color conversion profile can be created in correspondence with every color material set.

The present invention is not implemented by a single device and may be implemented in dispersed fashion across a plurality of devices. For example, a request may be sent by the request means to an external device which is connected via a communication line to create a color conversion profile which prescribes conversion rules for converting the image data of the print target into the image data of a color material amount set, in accordance with the color material set. That is, in cases where the creation means are implemented by means of an external device, the color conversion profile can be created by means of the external device by issuing a request to create the color conversion profile to the external device. Accordingly, the processing load of the printing control device can be reduced. As long as the color conversion means receives and uses the color conversion profile created by the external device, the color conversion means is able to implement color conversion which corresponds with the request.

It goes without saying that the technical idea of the present invention is not limited to a device and can be implemented specifically by a program that implements the aforementioned means in co-operation with the hardware of a computer or the like. Furthermore, the printing control device of the present invention is not limited to existing as a single entity, there being also cases where the printing control device is integrated as part of a certain device. For example, it goes without saying that a printing device, color conversion device, image processing device, or personal computer which comprises, as apart thereof, means which constitutes the printing control device of the present invention can be implemented by the present invention. Furthermore, the respective means constituting the present invention may be implemented by distributed processing of a plurality of substantive devices. For example, some of the means of the present invention may be implemented by a personal computer while the other means are implemented by a printing device. Naturally, the respective means of the present invention may also be distributed via a network.

BRIEF DESCRIPTION OF THE DRAWINGS

FIG. 15 shows a spectral Neugebauer model;

FIG. 16 shows a Cellular Yule-Nielsen spectral Neugebauer model;

FIG. 19 illustrates a smoothing extent evaluation index;

FIG. 24 shows an example of a UI screen according to the modified example;

FIG. 25 shows an example of a UI screen according to the modified example;

FIG. 26 shows an example of a UI screen according to the modified example;

FIG. 27 shows a list of ink amount sets which permit the suppression of graininess;

FIG. 29 is a block diagram which shows the constitution of a printing device according to the modified example.

DESCRIPTION OF EXEMPLARY EMBODIMENTS

Figure 1:
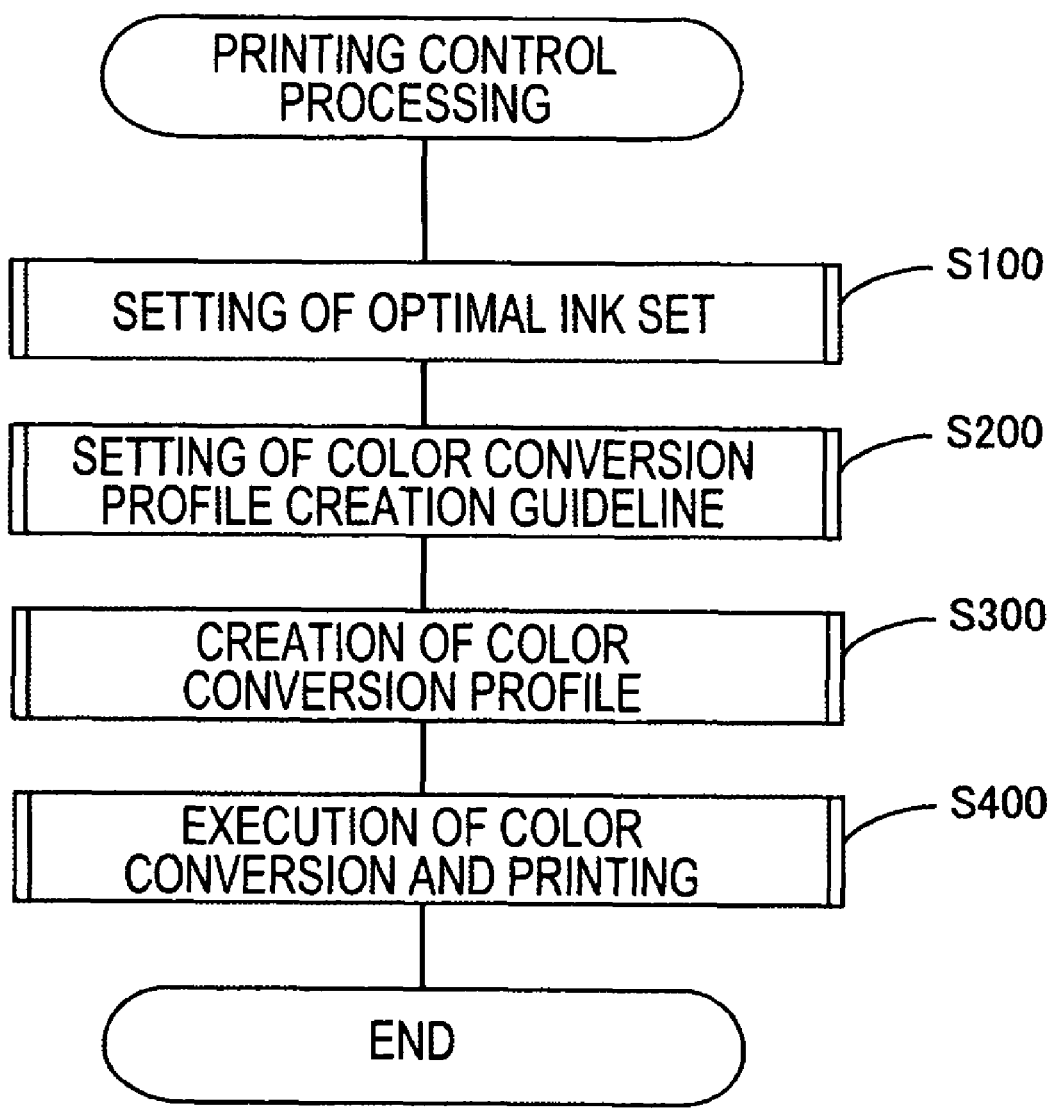
FIG. 1 is a flowchart showing the whole flow of printing control processing.

An embodiment of the present invention will be described next in the following order.
A. Printing control:
 A-1. Hardware and software constitution:
 A-2. Ink set setting:
 A-3. Setting of color conversion profile creation guideline:
 A-4. Creation of color conversion profile:
 A-5. Color conversion and printing:
B. Various converters:
 B-1. Spectral printing model converter:
 B-2. Color converter:
 B-3. Graininess converter:
 B-4. Smoothness converter:
C. Conclusion and Modified examples:
 C-1. Modified example 1:
 C-2. Modified example 2:
 A. Printing Control
A-1. Hardware and Software Constitution FIG. 1 shows the schematic flow of printing control processing executed by the printing control device of the present invention. In step S100 (described in section A-2) in FIG. 1, the printing control device selects an ink set which is suitable for printing the image data of the print target and sets the ink set as the ink set to be used. In step S200 (described in section A-3), the existence of the importance to create a color conversion profile on the basis of the type of ink installed in the printing device or based on an instruction from the user and the creation guideline in a case where a color conversion profile is created. In step S300 (described in section A-4), processing to create a color conversion profile is performed on the basis of the creation guideline set in step S200. In the creation of the color conversion profile in step S300, various converters which convert the ink amount sets into the respective index values (described in sections B-1 to B-4) are used. In addition, in step S400 (described in section A-5), color conversion is performed by using the color conversion profile thus created and printing is executed by controlling the printing device on the basis of the conversion result.

Figure 2:
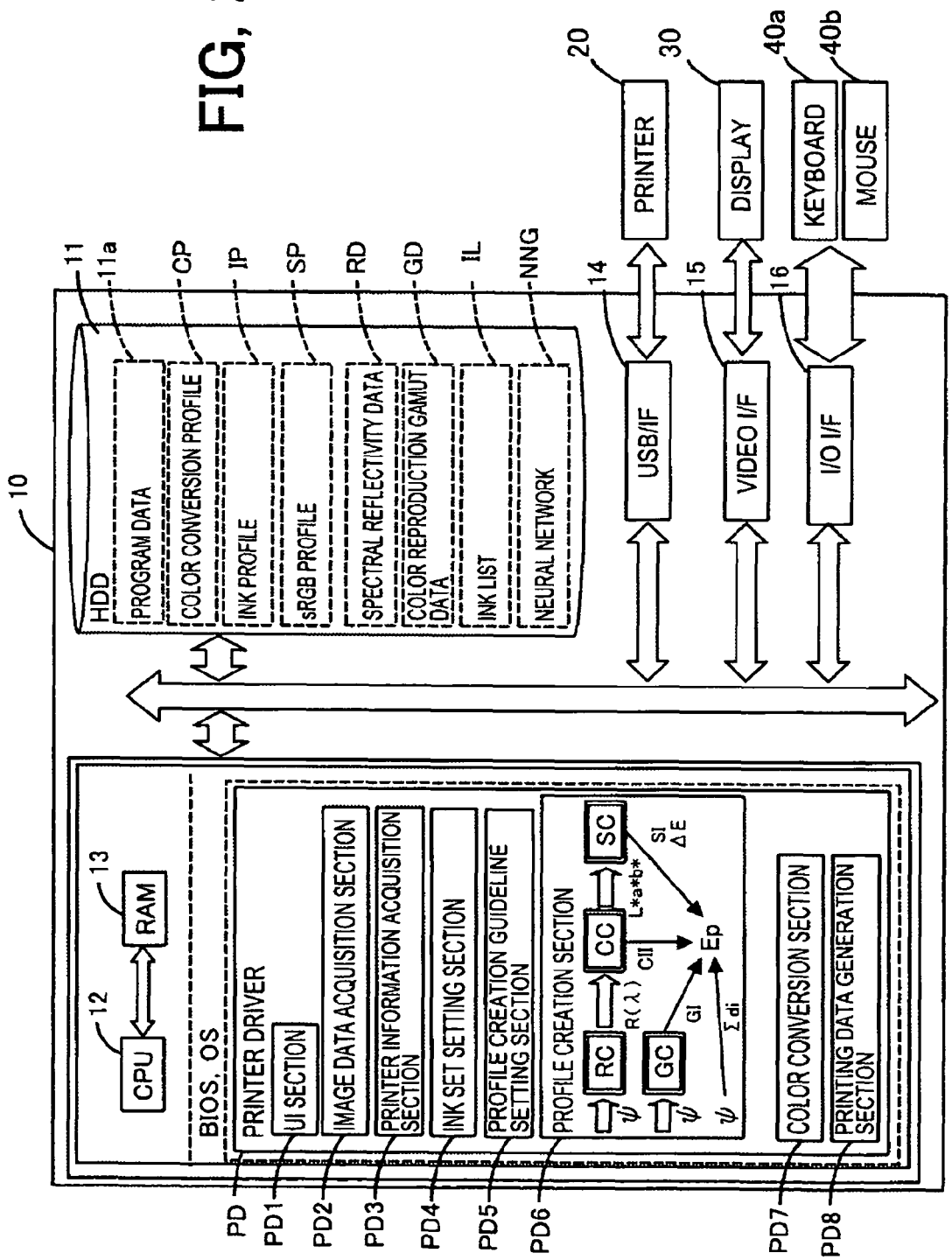
FIG. 2 is a block diagram which shows the constitution of the printing control device.

FIG. 2 shows the hardware constitution and software constitution of the printing control device. The principal parts of the printing control device of the present invention are basically executed by a computer 10. More specifically, the CPU 12 which the computer 10 comprises reads program data 11a which are stored in a hard disk drive (HDD) 11 or the like and executes computation in accordance with program data 11a while expanding the program data 11 on RAM 13. Further, the various means for constituting the printing control device of the present invention are implemented by controlling a printer 20 which is the printing device of the present invention by means of computation via a USB interface (I/F) 14 or the like. Obviously, the computer 10 and printer 20 may also be connected to an infrared or wireless LAN interface or another interface. The computer 10 is connected to a display 30 via a video interface (I/F) 15 and the keyboard 40a and mouse 40b are connected via an input interface (I/F) 16.

The printer driver PD comprises a UI section PD1 which displays a UI screen on the display 30 and receives an instruction from the user via the keyboard 40a and mouse 40b and an image data acquisition section PD2 which acquires print target image data. Further, the printer driver PD comprises a printer information acquisition section PD3 which acquires printer information starting with the ink cartridge installation status from the printer 20, an ink set setting section PD4 which sets an ink set which is suitable for printing the image data of the print target, and a profile creation guideline setting section PD5 for setting a creation guideline for a color conversion profile on the basis of printer information and an instruction from the user, and so forth. The color conversion profile CP is a lookup table in this embodiment.

The printer driver PD comprises a profile creation section PD6 which creates a color conversion profile in accordance with the creation guideline of the color conversion profile. When the profile creation section PD6 creates a color conversion profile, a spectral printing model converter RC, a color converter CC, a graininess converter GC, and a smoothness converter SC are utilized. Further, the printer driver PD comprises a color conversion section PD7, which performs color conversion by using the color conversion profile CP thus created, and a print data generation section PD8 that generates print data by performing half-tone processing or rasterizing processing on the color-converted image data. Details on the respective modules PD1 to PD8, RC, CC, GC, and SC which constitute the printer driver PD will be provided subsequently together with the flow of the processing.

Figure 3:
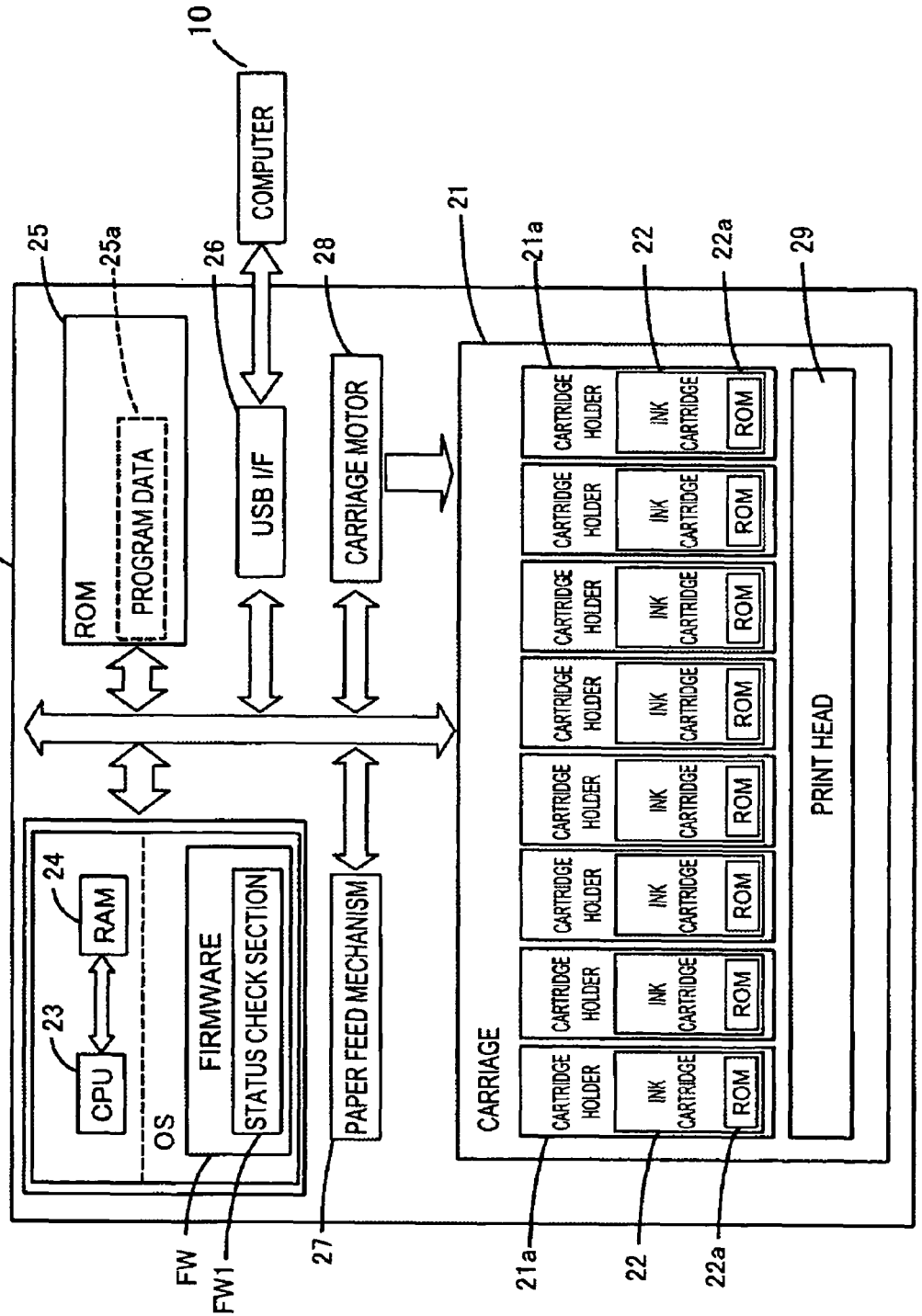
FIG. 3 is a block diagram which shows the constitution of the printer.

FIG. 3 shows the constitution of the printer 20 controlled by the printing control device of the present invention. In FIG. 3, the printer 20 comprises a CPU 23, a RAM 24, and a ROM 25. Firmware FW for controlling the printer 20 is executed as a result of the CPU 23 performing computation in accordance with program data 25a stored in the ROM 25 while expanding the program data 25a in the RAM 24. The firmware FW generates drive signals for a paper feed mechanism 27, a carriage motor 28 and a print head 29 and so forth on the basis of print data which are input from the computer 10 via the USB I/F 26. The printer 20 comprises a carriage 21 and the carriage 21 installs ink cartridges 22a, 22a . . . which hold ink of a plurality of types. The ink cartridges 22a, 22a . . . correspond to the color material containers of the present invention. The carriage 21 comprises the print head 29 which discharges ink that is supplied by the ink cartridges 22a, 22a . . . from a multiplicity of ink nozzles.

The print head 29 can be made to move reciprocatingly together with the cartridge 21 by the driving of the carriage motor 28 and a raster in the main scanning direction can be formed by the relative movement between the ink nozzles and print paper resulting from this reciprocating movement. Meanwhile, a planar image can be printed on print paper as a result of the paper feed mechanism 27 moving the print paper in secondary scanning which is orthogonal to the main scanning direction. The printer of this embodiment is a printer of an inkjet system. However, in addition to a printer of an inkjet system, the present invention can also be applied to a variety of printers. The present invention can also be applied to a laser printer which uses toner as color material, for example.

The carriage 21 comprises cartridge holders 21a, 21a . . . in which the ink cartridges 22a, 22a . . . can be installed and the respective ink cartridges 22a, 22a . . . can be inserted into and secured in cartridge holders 21a, 21a . . . . In this embodiment, eight cartridge holders 21a, 21a . . . are provided and a maximum of eight ink cartridges 22a, 22a . . . can be installed.

The ink cartridges 22a, 22a . . . each contain ink which is formed by mixing colorant or dye color material with a liquid.

Inks of different types are contained in the respective ink cartridges 22a, 22a . . . and a color image is reproduced by means of subtractive color mixing of the respective inks. The ink cartridges 22a, 22a . . . comprise in volatile ROM 22a1, 22a1 . . . that store identification data for identifying the types of the respective inks and remaining quantity data specifying the remaining quantity of each ink. As a result of installing the ink cartridges 22a, 22a . . . in the cartridge holders 21a, 21a . . . , a terminal (not shown) which is provided in the cartridge holders 21a, 21a . . . can be electrically connected to the ROM 22a1, 22a1 . . . and a status check section FW1 of the firmware FW which is executed by the CPU 23 and RAM 24 is able to acquire the types and remaining amounts of the inks contained in the respective ink cartridges 22a, 22a . . . . The status check section FW1 transmits the ink installation status to the computer 10 via the USB I/F 26.

Furthermore, by installing the ink cartridges 22a, 22a . . . in the cartridge holders 21a, 21a. . . , the ink supply path in the ink cartridges 22a, 22a . . . and the ink supply path from the cartridge holders 21a, 21a . . . to the ink nozzles of the print head 29 are connected. In this embodiment, all of the cartridge holders 21a, 21a . . . have the same shape and all of the ink cartridges 22a, 22a . . . also have the same shape. Therefore, any ink cartridges 22a, 22a . . . can be installed in any cartridge holders 21a, 21a . . . , depending on the user's preference. Hence, assuming that the difference in the installation position with respect to the cartridge holders 21a, 21a . . . is not distinguished, the number of ink set combinations which can arise in a case where thirteen types of ink are installed in eight cartridge holders 21a, 21a . . . rises to as many as $_{13}C_8+_{13}C_7+_{13}C_6+_{13}C_5+_{13}C_4+_{13}C_3+_{13}C_2+_{13}C_1=7098$. However, the user may optionally install ink cartridges 22a, 22a . . . which hold at least some of the inks or may only install ink cartridges 22a, 22a . . . which hold a specified ink in some of the cartridge holders 21a, 21a . . . . For example, there may be a restriction according to which ink combinations which allow the minimum reproducible color reproduction gamut to be secured must be installed in specified cartridge holders 21a, 21a . . . .

A-2. Ink Set Setting

Figure 4:
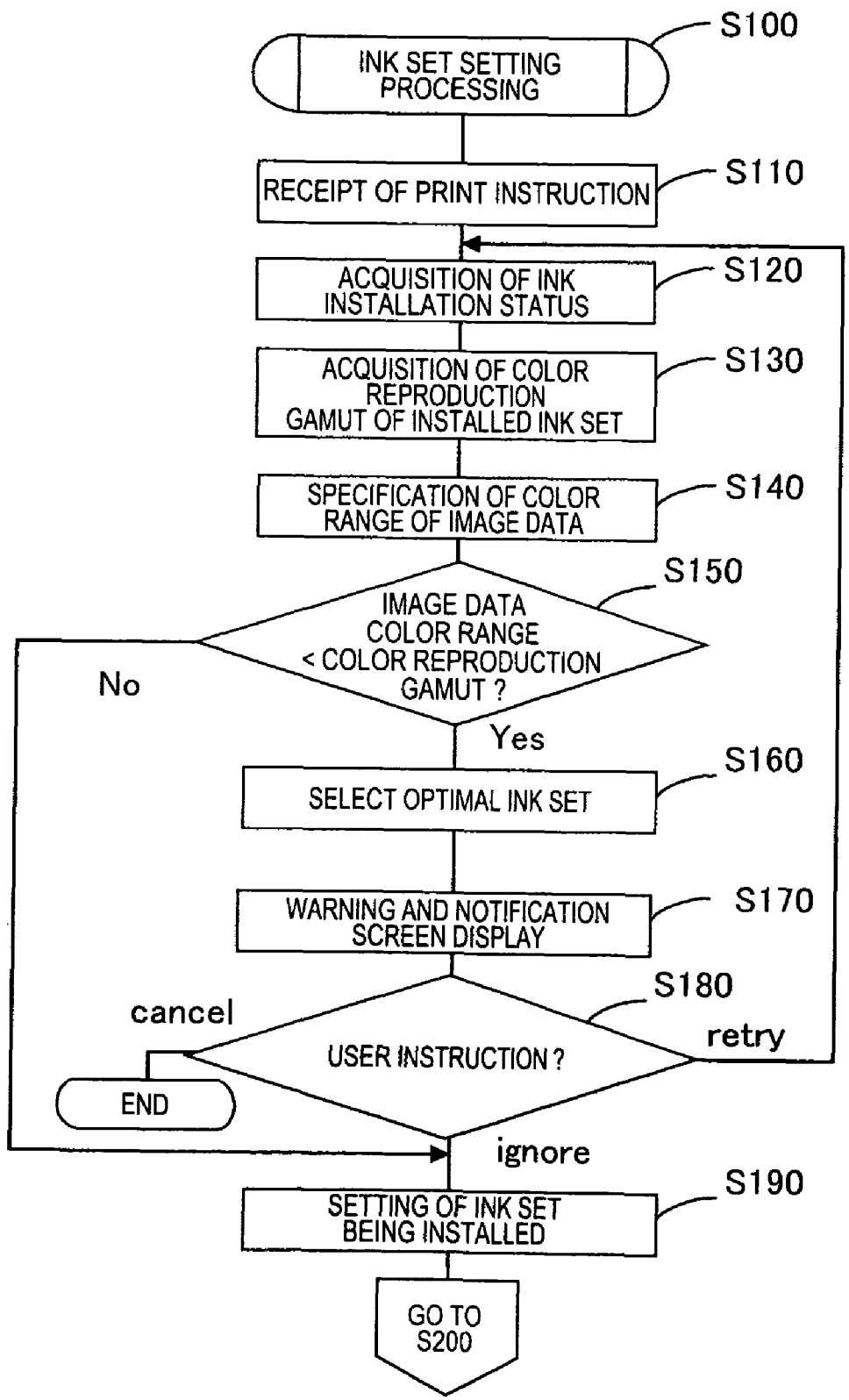
FIG. 4 is a flowchart of the ink set setting processing.

FIG. 4 shows the flow of the ink set setting processing. In FIG. 4, in step S110, the UI section PD1 displays a UI screen on the display 30 and receives a print instruction via the keyboard 40a and mouse 40b and the image data acquisition section PD2 acquires the image data of the print target from HDD 11 or another application program, for example. In this embodiment, image data for which the colors of the respective pixels are specified by RGB coordinates of the sRGB color space (a first color space) are designated as the image data of the print target. When the image data of the print target can be acquired, in step S120, the printer information acquisition section PD3 acquires printer information via the USB I/F 14 by performing communications with the status check section FW1 which is being executed by the printer 20. In this embodiment, the installation status of the ink cartridges 22a, 22a . . . in the cartridge holders 21a, 21a . . . is acquired.

Figure 5:
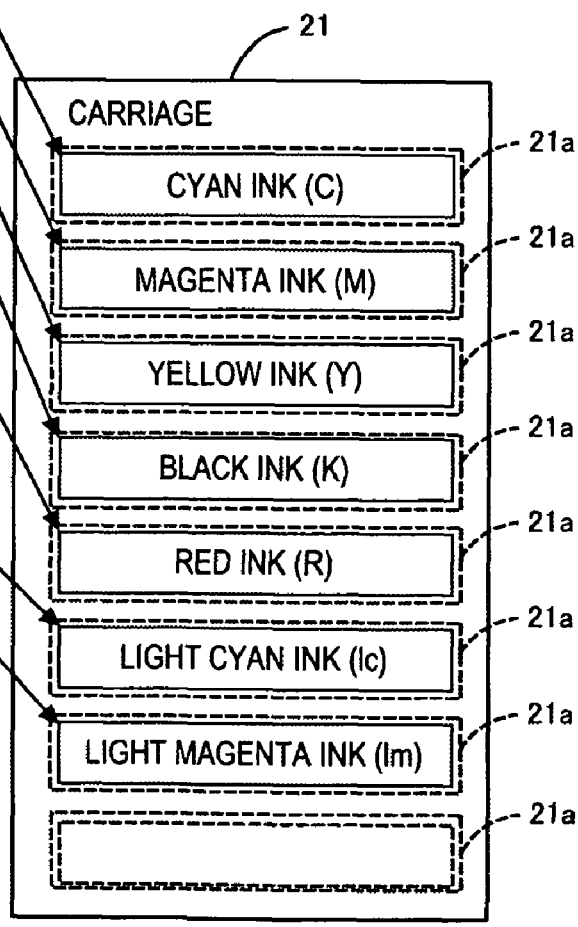
FIG. 5 is a schematic diagram which illustrates the ink installation status.

FIG. 5 schematically illustrates an example of the installation status of the ink cartridges 22a, 22a . . . in the cartridge holders 21a, 21a . . . . In FIG. 5, the ink cartridges 22a, 22a . . . , which can be installed in the model of the printer 20 respectively, contain M (magenta) ink, lm (light magenta) ink, C (cyan) ink, lc (light cyan) ink, Y (yellow) ink, K (black) ink, lk (gray) ink, llk (light gray) ink, R (red) ink, O (orange) ink, G (green) ink, B (blue) ink, and dy (dark yellow) ink. The data which the ROM 22a1, 22a1 . . . comprise and with which the types of the ink contained in each ink cartridge can be identified are written to the respective ink cartridges 22a, 22a . . . .

Therefore, in step S120, by accessing the ROM 22a1, 22a1 . . . of the ink cartridges 22a, 22a . . . in which the status check section FW1 is installed, information on the ink contained in the installed ink cartridges 22a, 22a . . . can be acquired. Because the ROM 22a1, 22a1 . . . in uninstalled cartridge holders 21a, 21a . . . cannot be accessed, it is possible to identify that an ink cartridge is uninstalled based on the fact that access is impossible. Furthermore, in cases where the fact that there is no remaining quantity of ink is recorded in the ROM 22a1, 22a1 . . . even when ink cartridges are installed, non-installation may be identified from this fact.

The respective ink cartridges 22a, 22a . . . which contain the above thirteen types of ink are independent and can each be purchased individually. The user purchases his desired ink cartridges 22a, 22a . . . and installs the ink cartridges 22a, 22a . . . in the cartridge holders 21a, 21a . . . . In this embodiment, an ink set which is constituted by CMYKRlclm inks (seven types) is installed in the cartridge holders 21a, 21a . . . .

In step S130, color reproduction gamut data GD stored in the HDD 11 is acquired and a color reproduction gamut of an ink set comprising CMYKRlclm which can be used currently by the printer 20 is acquired. In the color reproduction gamut data GD of this embodiment, the color reproduction gamut of the respective ink sets as a second print performance are specified by the values $L^*a^*b^*$ in the CIELAB color space. In addition, the color reproduction gamut data GD may be printed on standard print paper by using the respective ink sets or only the color reproduction gamut in the case observed in the standard observation light source may be stored. More strictly, the color reproduction gamut of each ink set may be stored for each type of print paper being printed or the color reproduction gamut of each of each ink set for each observation light source being observed may be stored. In the case of this embodiment, the color reproduction gamut is specified for each of 7098 ink sets by means of the $L^*a^*b^*$ values in the CIELAB color space.

The color reproduction gamut data GD are stored in the HDD 11 when the printer driver PD is installed. In step S140, the RGB values of the respective pixels of the image data of the print target acquired in step S110 are acquired and the RGB of the respective pixels are sequentially converted into $L^*a^*b^*$ values in the CIELAB color space. The $L^*a^*b^*$ values are prescribed by an sRGB profile SP which conforms to the CIE reference of the sRGB color space and CIELAB color space represented by the image data of the print target and the sRGP profile SP can be read from the HDD 11 and the RGB values can be converted into $L^*a^*b^*$ values. In cases where a profile for performing color correction is created, conversion to $L^*a^*b^*$ values which considers color correction may be performed. In step S150, it is judged whether the $L^*a^*b^*$ values of all of the pixels of the image data of the print target lie in the color reproduction gamut of a CMYKRlclm ink set.

Figure 6:
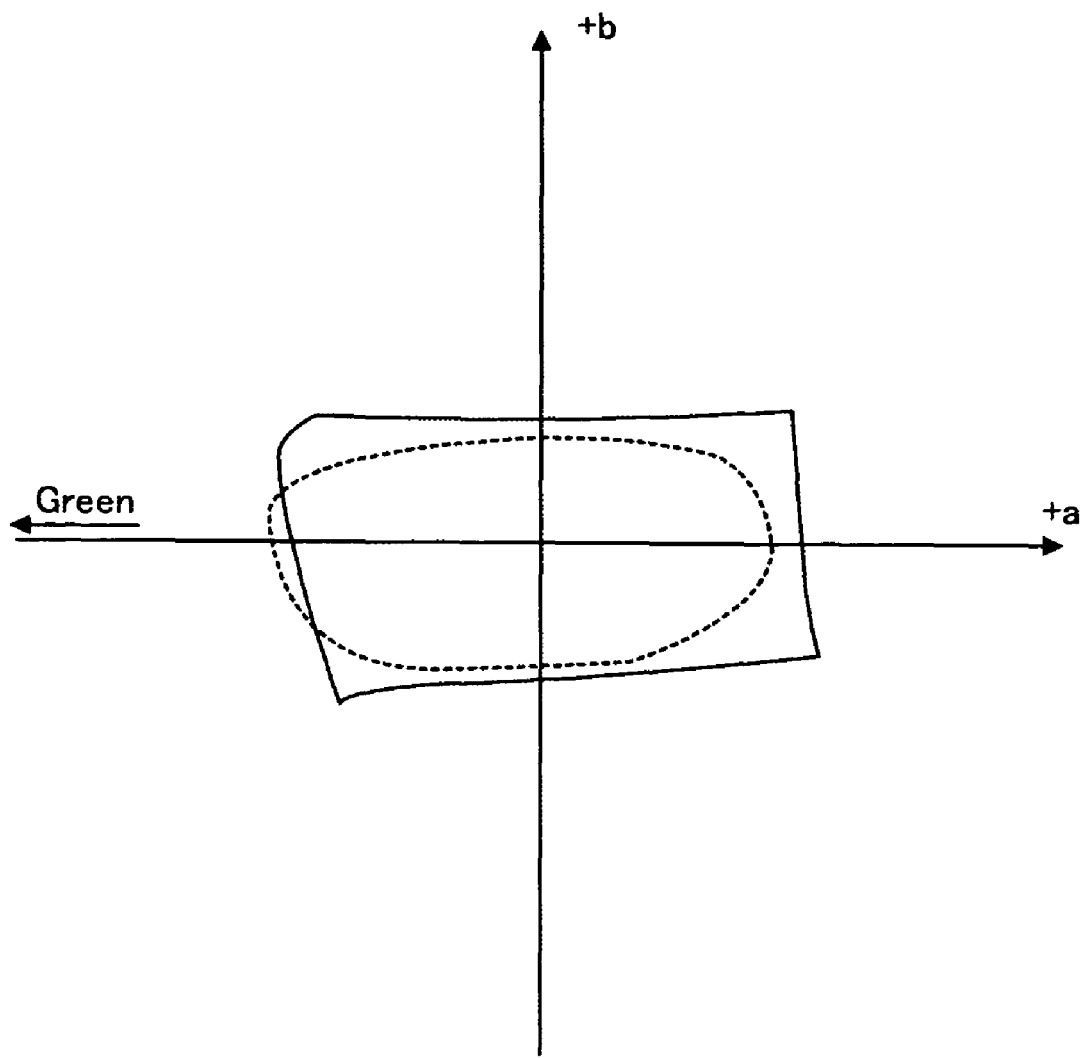
FIG. 6 illustrates a color reproduction gamut.

FIG. 6 schematically shows the aspect of the judgment in step S150. In FIG. 6, plane $a^*b^*$ of brightness ($L^*$) in the CIELAB color space is shown and the color reproduction gamut of the CMYKRlclm ink set is indicated by means of a solid line. Furthermore, the distribution range of the $a^*b^*$ values of the pixels of this brightness among the pixels of the image data of the print target is indicated by a broken line. The example of FIG. 6 shows that the color reproduction gamut of the CMYKRlclm ink set does not completely cover the distribution range of the pixels of the image data and that the color in the green direction cannot be reproduced with the CMYKRlclm ink set. The comparison between the color reproduction gamut and the color gamut which can be obtained with the image data is performed for all brightness levels (L*).

The color reproduction gamut comparison is desirably carried out by means of a non-device dependent color space, which may be an sRGB color space and XYZ color space. Here, in cases where the L*a*b* values of all of the pixels of the image data of the print target are judged to exist within the color reproduction gamut of the ink set installed in the printer 20, the ink set setting section PD4 sets the ink set which is installed in the printer 20 as the ink set which is used for printing (step S190) and the processing advances to the color conversion profile creation guideline setting processing of steps 200. On the other hand, as per the example in FIG. 6, in cases where it is judged that the L*a*b* values of all of the pixels of the image data of the print target are within the color reproduction gamut of the CMYKRlclm ink set, an ink set which comprises a reproduction gamut which is optimal for the printing of the image data of the print target is selected in step S160 by means of the color reproduction gamut data GD.

The color reproduction gamut data GD stores information which specifies the color reproduction gamut for all (7098) of the ink sets which can be combined. Hence, an ink set which comprises a color reproduction gamut which is suitable for printing the image data of the print target can be selected. An example of the specific procedure for this selection will be illustrated hereinbelow. First, the proportion of the number of pixels for which the L*a*b* values exist within the color reproduction gamut of each ink set in relation to the number of pixels of the whole image data is calculated as the cover ratio. Furthermore, the respective ink sets are sorted in order starting with the highest cover ratio. In an ink set with a 100% cover ratio, the L*a*b* values of all the pixels of the image data of the print target exist in the color reproduction gamut and a favorable color reproducibility can be implemented. Hence, in the case of an ink set whose cover ratio is basically 100%, there is no problem irrespective of the ink set used.

However, because there is no positive proof that the user owns the ink cartridges 22a, 22a ... which are not installed in the cartridge holders 21a, 21a ... of printer 20, an ink set with as few changes as possible from the ink set which is currently installed (CMYKRlclm) is selected. In this embodiment, an ink set obtained by adding G ink to the ink set which can be used currently (CMYKRlclm) is selected as the optimal ink set. Naturally, an ink set which satisfies a cover ratio of 100% and with the minimum number of inks may be selected as the optimal ink set or an ink set with the greatest scope in the color reproduction gamut may be selected as the optimal ink set. Conversely, an ink set which satisfies a cover ratio of 100% and with a minimal color reproduction gamut may be selected as the optimal ink set. If the number of lattice points is the same, the density of the lattice points increases with an increasingly small color reproduction gamut. Hence, a color conversion profile CP with favorable tonality can be created. However, in cases where not even one ink set satisfying a cover ratio of 100% has been selected, the ink set with the highest cover ratio is selected as the optimal ink set. In the next step S170, the UI section PD1 displays a warning and report screen on the display 30.

Figure 7:
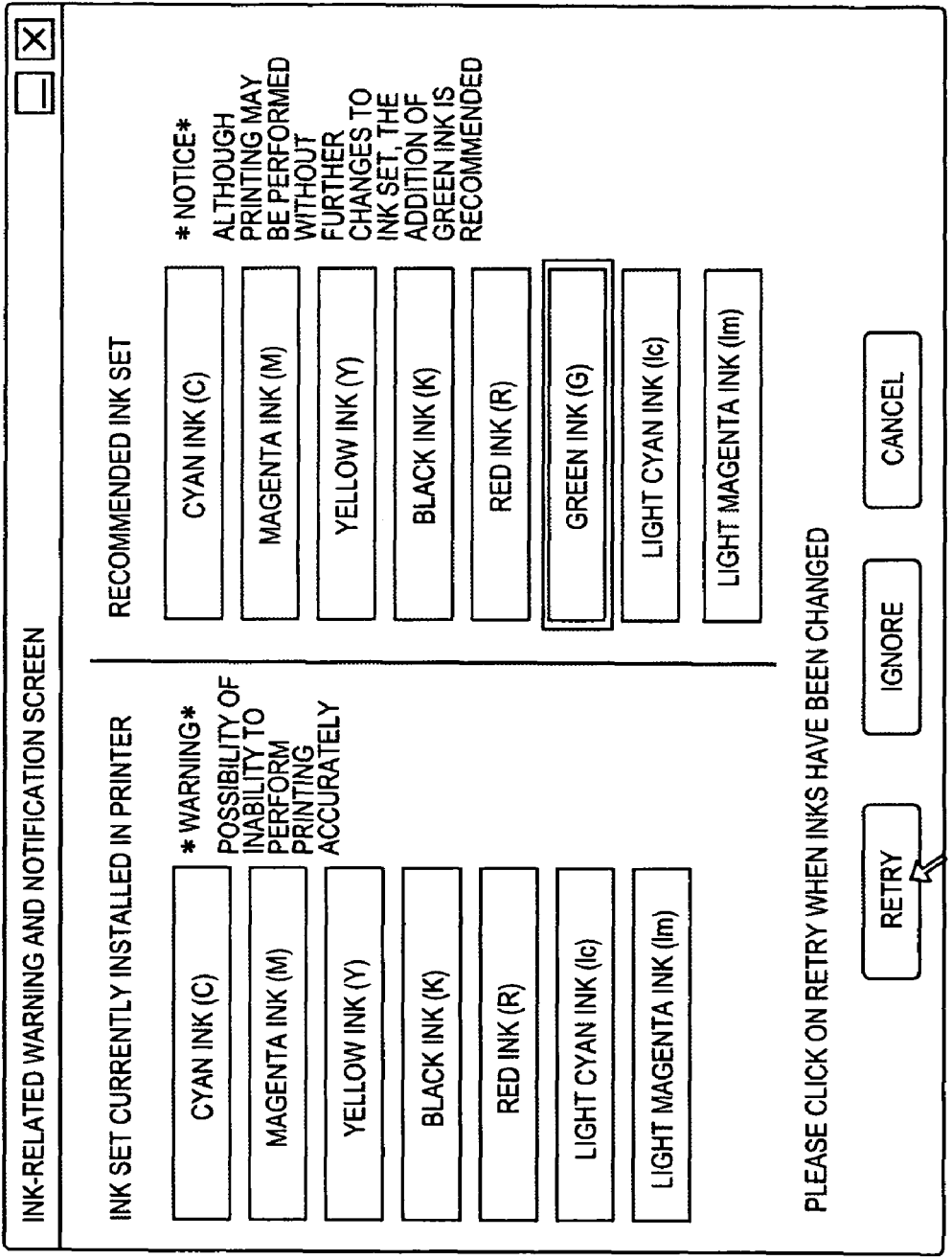
FIG. 7 shows a monitoring and reporting screen.

FIG. 7 shows an example of the warning and report screen. In FIG. 7, a display of an ink set (CMYKRlclm) in which the ink cartridges 22a, 22a ... are installed in the cartridge holders 21a, 21a ... and the fact that the colors of the image data of the print target cannot be accurately reproduced by means of the ink set is currently shown. In addition, a display which recommends the optimal ink set selected in step S160 is provided. Furthermore, when ink is replaced, the fact that the retry button is to be clicked after replacing the ink cartridge is shown. A button with which the user selects either ignore, retry, or cancel is provided at the bottom of the screen.

In step S180, the pushing of the select button via the mouse 40b is detected and, if the ignore button is pushed, the ink set installed in the printer 20 is set as the ink set to be used for printing (step S190) and the processing advances to the color conversion profile creation guideline setting processing of step S200. If the retry button is pushed, the processing returns to step S120 and the processing up until steps S120 to S160 is similarly executed for an exchanged ink set. Therefore, in cases where the user installs ink cartridges 22a, 22a ... in the cartridge holders 21a, 21a ... as recommended, the processing advances to step S200 after setting the recommended ink set the next time as the ink set to be used for printing in step S190. If the cancel button is pushed, the processing is terminated as is.

A-3. Setting of the Color Conversion Profile Creation Guideline

Figure 8:
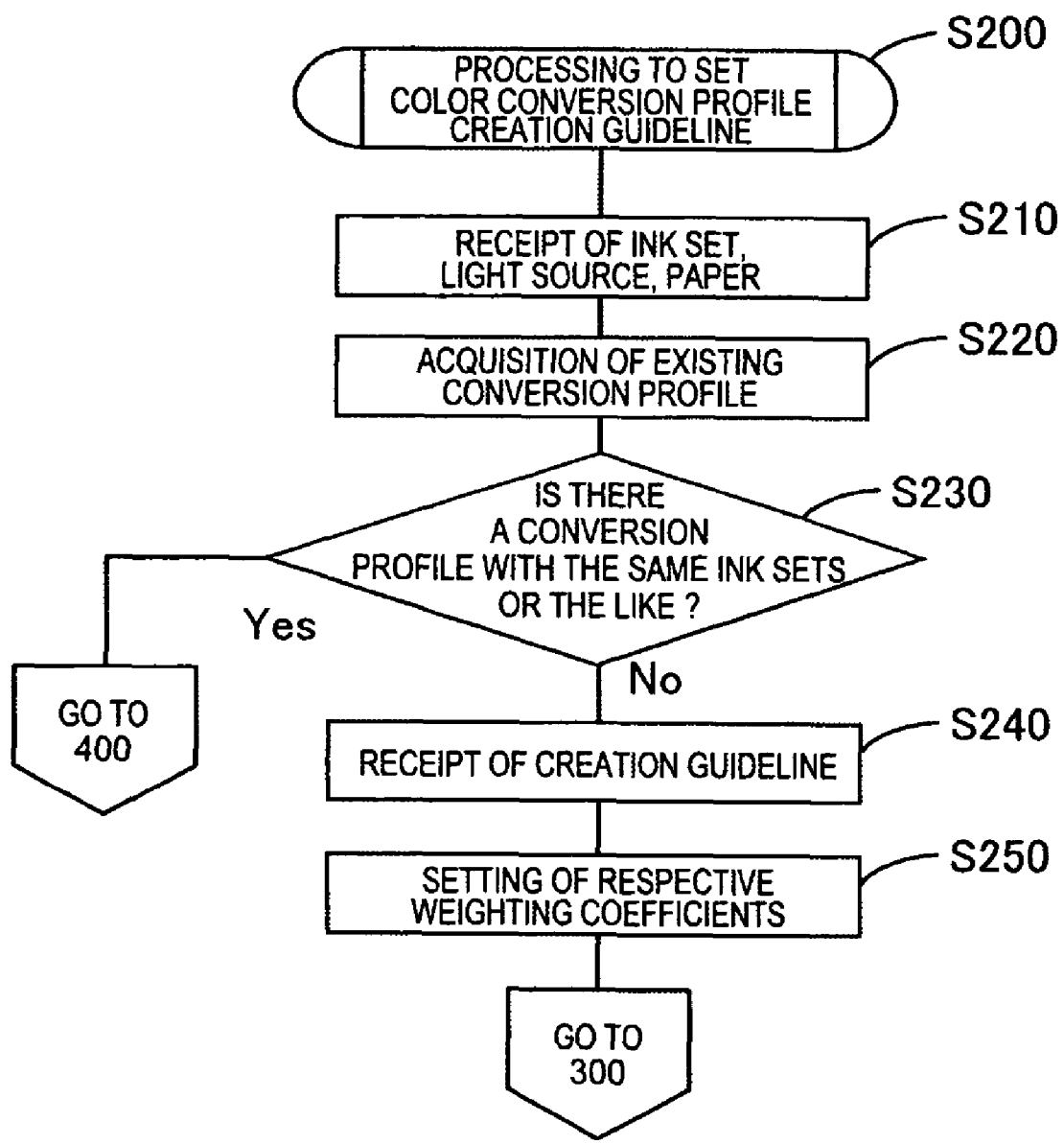
FIG. 8 is a flowchart of the color conversion profile creation guideline setting processing.

FIG. 8 shows the flow of the processing to set the color conversion profile creation guideline (step S200). In step S210, the UI section PD1 displays a UI screen on the display 30 and receives a designation of the type of print paper used for printing and a designation of the observation light source for observing the printed matter.

Figure 9:
FIG. 9 shows a UI screen for the selection of ink used.

FIG. 9 shows a UI screen which is displayed in step S210. In FIG. 9, it is possible to designate the type of the print paper used for printing as well as the observation light source for observing the printed matter. Here, the selection of glossy paper as the print paper and of D65 light as the observation light source are described hereinbelow. When the UI section PD1 identifies the fact that the apply button has been clicked by using mouse 40b, in step S220 the profile creation guideline setting section PD5 acquires an existing color conversion profile which has already been stored in the HDD 11.

In step S230, the profile creation guideline setting section PD5 makes a judgment regarding the necessity to create color conversion profile. Here, the profile creation guideline setting section PD5 judges whether the ink set which was set in the ink set setting processing of step S100 and the designated print paper and observation light source match any of the ink set, print paper, and light source acquired in step S220. In cases where a color conversion profile with the same ink set, print paper, and light source already exists in HDD 11, it is assumed that there is no need to newly create a color conversion profile and the profile creation guideline setting section PD5 executes printing in step S400 of FIG. 1 as is. However, in cases where the ink set, print paper, and observation light source do not match any of the existing color conversion profiles, the profile creation guideline setting section PD5 judges that it is necessary to create a color conversion profile. When it is judged that there is a need to create a color conversion profile, in step S240 the UI section PD1 displays a UI screen on the display 30 and receives a designation of a color conversion profile creation guideline from the user via the keyboard 40a and mouse 40b.

Figure 10:
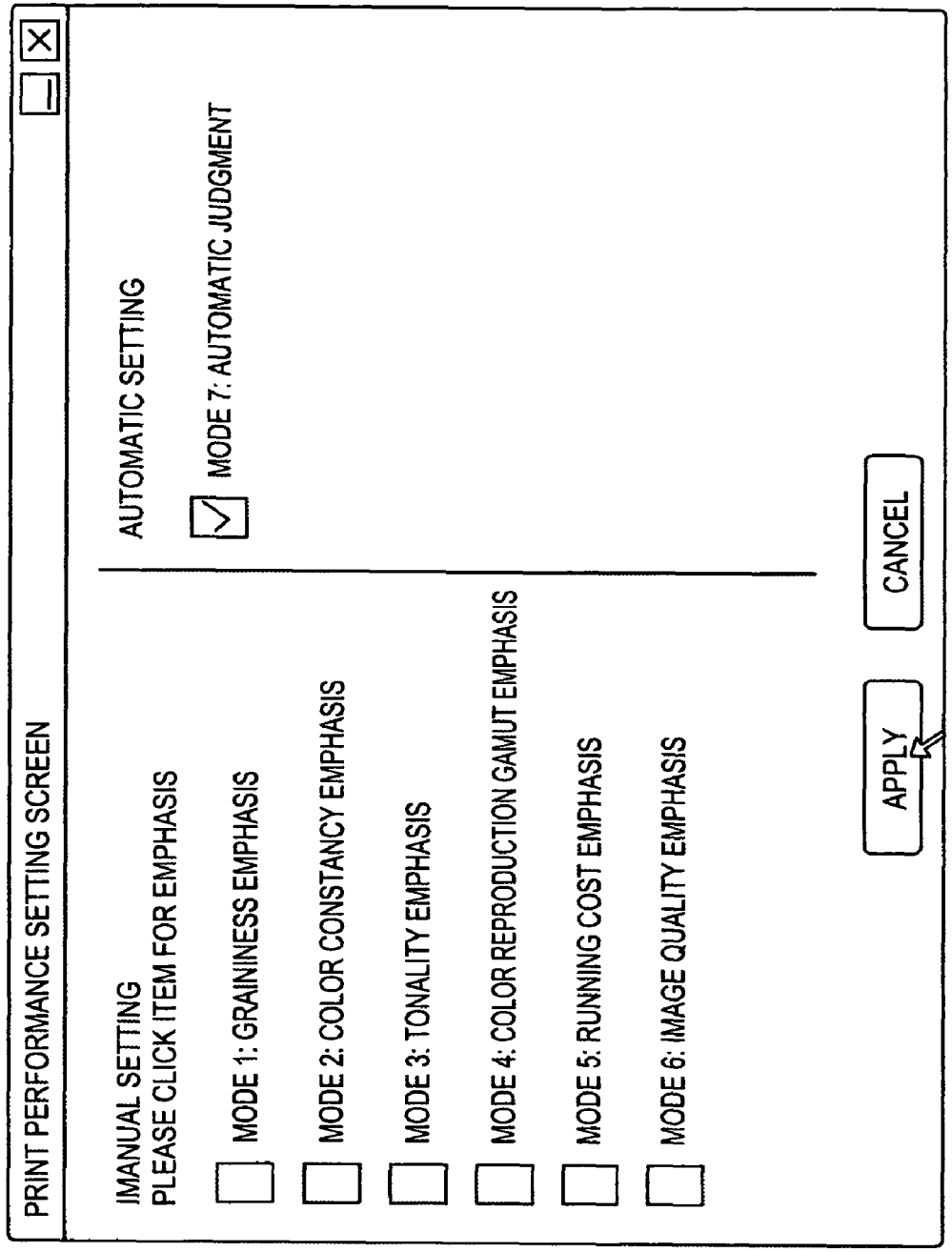
FIG. 10 shows a UI screen for mode selection.

FIG. 10 shows a UI screen which is displayed in step S240. In FIG. 10, the following options which allow the profile creation guideline setting section PD5 to determine a color conversion profile creation guideline are prepared.

Mode 1: Graininess emphasis
    Mode 2: Color constancy emphasis
    Mode 3: Tonality emphasis
    Mode 4: Color reproduction gamut emphasis
    Mode 5: Running cost emphasis
    Mode 6: Image quality emphasis
    Mode 7: Automation emphasis When the user selects any of these modes, the profile creation guideline setting section PD5 sets the following weighting coefficients $w_1$ to $w_5$ in Equation (1) below in step S250.

[Equation 1]

$$E_p(\phi) = \frac{w_1 GI(\phi)}{\max\{w_1 GI(\phi)\}} + \frac{w_2 CII(\phi)}{\max\{w_2 CII(\phi)\}} + \frac{w_3 SI(\phi)}{\max\{w_3 SI(\phi)\}} + w_4 \Delta E + \frac{w_5 \sum_{i=1}^{N} d_i}{T_{Duty} * 256} \quad (1)$$

In Equation (1), $E_P$ indicates the evaluation function and the evaluation function $E_P$ possesses the quality that the overall print performance (a first print performance) increases the smaller the evaluation function $E_P$ becomes. $\phi$ represents the ink amount set ($d_c$, $d_m$, $d_y$, $d_k$, $d_g$, $d_{lc}$, $d_{lm}$) which signifies the combination of ink amounts of the respective inks of the set ink set (CMYKGlclm in this embodiment). The first term of Equation (1) above is a term which requires the performance of the graininess of the printed matter; the second term is a term which requires the color constancy performance with respect to changes in the light source of the print colors; the third term is a term which requires the tonality performance of the printed matter; the fourth term is a term which requires the performance of the color reproduction gamut; and the fifth term is a term which requires the running cost performance for the ink which is consumed during printing and is obtained by adding the respective ink amounts $d_c$, $d_m$, $d_y$, $d_k$, $d_g$, $d_{lc}$, $d_{lm}$.

The fifth term is also dependent on the ink amount set ($d_c$, $d_m$, $d_y$, $d_k$, $d_g$, $d_{lc}$, $d_{lm}$) and can therefore be said to be a function of $\phi$. $T_{Duty}$ is a value which corresponds to a limit on the ink amount which is able to adhere to the recording medium. The smaller the ink amount, the more favorable the running costs and it may therefore be said that the running costs become optimum as the fifth term of Equation (1) decreases. All of the terms are scalar terms which are normalized using the same magnitude and the performance rises as the values of the terms decrease. Furthermore, by linking the first to fifth terms which correspond with the respective performance elements in linear fashion while adjusting the weightings by means of individual weighting coefficients $w_1$ to $w_5$, the evaluation coefficient $E_P$ with which an overall print performance can be evaluated is defined. That is, the weighting coefficients $w_1$ to $w_5$ signify values which regulate which performance elements are emphasized.

Here, in cases were mode 1 has been selected, the weighting coefficient $w_1$ is set from the default value to a large value and the other weighting coefficients $w_2$ to $w_5$ are changed from the default values to uniformly small values. As a result, the contribution to the evaluation coefficient $E_P$ of the graininess performance can be increased. Likewise, in cases where modes 2 to 5 are selected, the weighting coefficients $w_2$ to $w_5$ are set from the default values to large values and the other weighting coefficients $w_1$ to $w_5$ are changed from the default values to uniformly small values. As a result, the contribution to the evaluation function $E_P$ of the respective performance elements can be increased. Furthermore, in cases where mode 6 is selected, the weighting coefficients $w_1$ to $w_4$ are set from the default values to large values overall while only weighting coefficient $w_5$ is changed from the default values to a small value. As a result, the contributions to the evaluation function $E_P$ of the respective performance elements which correspond with the first to fourth image-related terms can be raised overall. The default values are values for which the levels of importance of the respective performance elements are balanced.

In cases where mode 7 is selected, the profile creation guideline setting section PD5 sets optimal weighting coefficients $w_1$ to $w_5$ on the basis of information that has been acquired thus far. Here, the optimal weighting coefficients $w_1$ to $w_5$ can be set on the basis of various judgment methods. For example, it may be considered that the higher the grade of print paper designated in step S210, the higher the user's need for image quality. In such a case, although not more striking than a case where mode 6 is explicitly designated, the weighting coefficients $w_1$ to $w_4$ are set from the default values to large values overall and only weighting coefficient $w_5$ is changed from the default value to a small value. In this embodiment, because glossy paper is selected in step S210, the weighting coefficients $w_1$ to $w_4$ come to be changed from the default values to large values overall.

Conversely, it may be considered that the lower the grade of the designated print paper, the lower the user's need for image quality. In this case, although not more striking than a case where mode 5 is explicitly designated, the weighting coefficients $w_1$ to $w_4$ are set from the default values to small values overall and only weighting coefficient $w_5$ is changed from the default value to a large value.

A case where the manufacturing source of the printer 20 recommends a specified ink set may also be considered. The recommendation of an ink set comprising CMYKRGBlk as an ink set with which bright colors can be reproduced may be considered, for example. In cases where the recommended CMYKRGBlk is installed in the printer 20, there is a need to emphasize a color reproduction gamut with a high color saturation. Hence, the weighting coefficient $w_4$ should be set to a large value. Further, the recommendation of an ink set comprising YKlklclm as an ink set which is suited to monotone printing may be considered. In cases where the recommended YKlklclm is installed in the printer 20, there is a need to emphasize the tonality. Hence, the weighting coefficient $w_3$ should be set to a large value. Thus, the correspondence between the specified ink set and the weighting coefficients $w_1$ to $w_5$ may be preset.

In addition, because the remaining ink amounts can be read from the ROM 22a1, 22a1 . . . of the respective ink cartridges 22a, 22a . . . , in mode 7, the optimal weighting coefficients $w_1$ to $w_5$ may be set automatically in accordance with the remaining ink amounts of the inks designated for use in the printing. In cases where any of the remaining ink amounts of the ink designated for use in the printing are small, because the amount of ink consumed is to be kept to a minimum, the weighting coefficient $w_5$ should be set to a value larger than the default value. In addition, the extent to which the weighting coefficient $w_5$ is increased is determined by also considering the number of prints and the colors indicated by the image data of the print target. For example, in cases where there is a small number of prints, printing is completed even when the weighting coefficient $w_5$ is set to a fairly large value.

In addition, the weighting coefficients $w_1$ to $w_4$ can also be set in accordance with the image data designated as the print target in step S110. For example, in cases where the image data of the print target represent a grayscale image or a sepia image, the image must be produced using only grayscales. Hence, the weighting coefficient $w_3$ may be set from the default value to a large value as per mode 3 and the other weighting coefficients $w_1$, $w_2$, $w_4$, and $w_5$ may be changed from the default values to uniformly small values. Furthermore, because slippage of the colors also readily occurs, the weighting coefficient $w_2$ may be set from the default value to a large value as per mode 2 and the other weighting coefficients $w_1$ and $w_3$ to $w_5$ may be changed from the default values to uniformly small values. Naturally, the weighting coefficients $w_1$ to $w_5$ can also be set depending on whether the image data of the print target is a document or a photograph. In addition, in step S180, in cases where the ignore button is pushed, the weighting coefficient $w_4$ may be set to a large value and the color reproduction gamut can be made as wide as possible. When the weighting coefficients $w_1$ to $w_5$ are set as above, the evaluation function $E_P$ is recommended and the creation guideline in the processing to create the color conversion profile described hereinbelow (step S300) is thus set.

A-4. Creation of Color Conversion Profile CP

Figure 11:
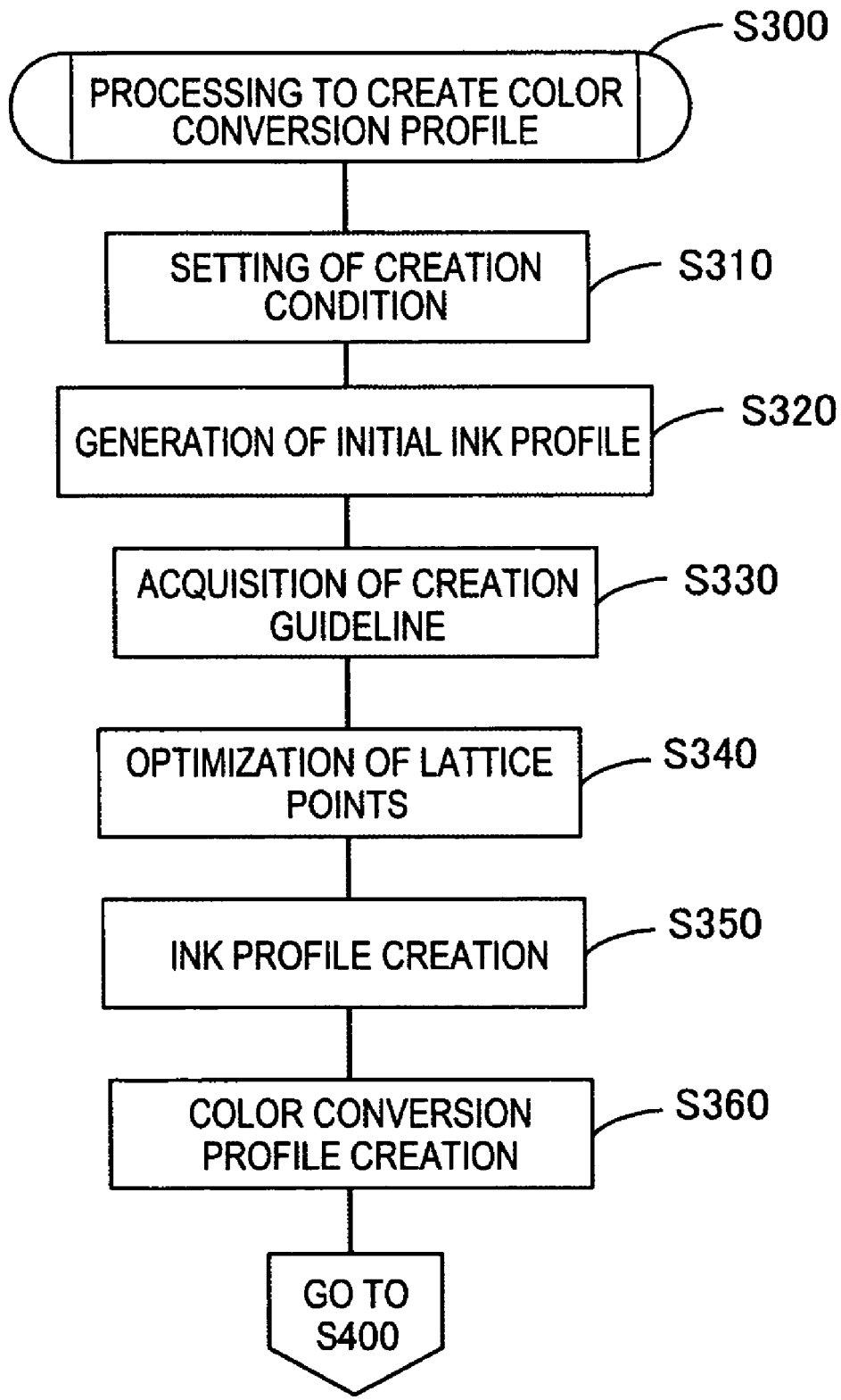
FIG. 11 is a flowchart which shows the flow of color conversion profile creation processing.
Figure 12:
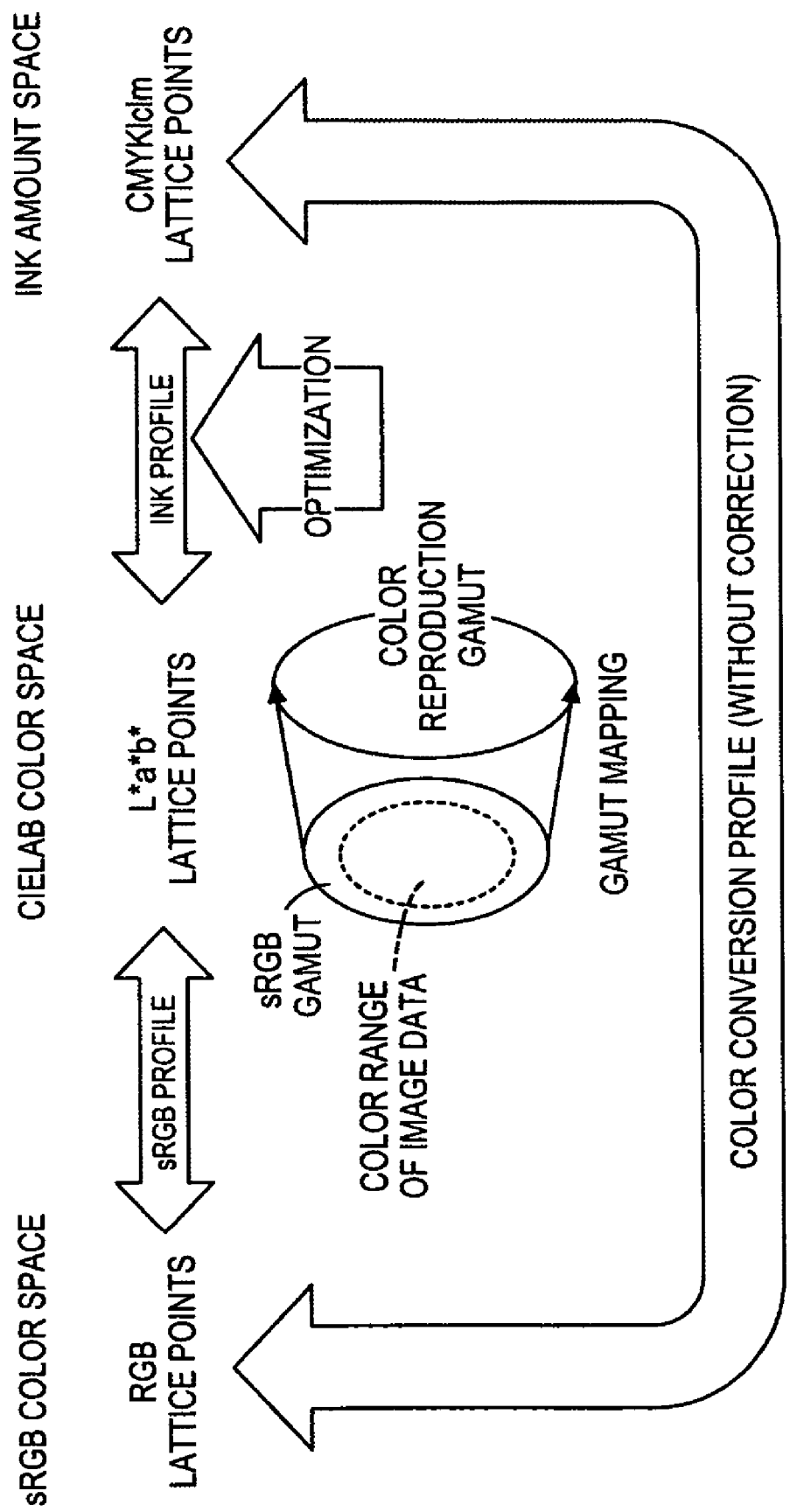
FIG. 12 schematically shows a procedure for creating a color conversion profile.

FIG. 11 shows the flow of the processing to create the color conversion profile CP that is executed by the profile creation section PD6 and FIG. 12 schematically shows the procedure for creating a color conversion profile CP. In step S310 shown in FIG. 11, the conditions for creating the color conversion profile CP are acquired and set to the spectral printing model converter RC and the color converter CC. The spectral printing model converter RC and the color converter CC predict the colors in a CIELAB color space (L*a*b*) which is an absolute color space from the ink amount set. However, the colors that are reproduced are dependent on the print paper and observation light source. Therefore, the print paper (glossy paper) and observation light source (D65) which are designated in step S210 are set to the spectral printing model converter RC and the color converter cc.

In step S320, an initial ink profile IP is created. The ink profile IP is a profile which prescribes the relationship between the CIELAB color space (L*a*b*) and the CMYKGlclm space ($d_c$, $d_m$, $d_y$, $d_k$, $d_g$, $d_{lc}$, $d_{lm}$) which is the ink amount space used for printing in this embodiment for a plurality of representative lattice points. In the creation of the initial ink profile IP, $17^3$ random ink amount sets ($d_c$, $d_m$, $d_y$, $d_k$, $d_g$, $d_{lc}$, $d_{lm}$) are generated from the ink amount space used for printing, for example. In addition, if ink amount sets ($d_c$, $d_m$, $d_y$, $d_k$, $d_g$, $d_{lc}$, $d_{lm}$) which correspond with the initial lattice points is obtained, printing is performed on the print paper which was designated in step S210 using the ink amount sets ($d_c$, $d_m$, $d_y$, $d_k$, $d_g$, $d_{lc}$, $d_{lm}$), and the colors (L*a*b*) during observation using the designated light source can be obtained as a result of prediction by the spectral printing model converter RC and the color converter CC. Therefore, the initial ink profile IP can be created by describing the relationship between the colors obtained (L*a*b*) and the ink amount sets ($d_c$, $d_m$, $d_y$, $d_k$, $d_g$, $d_{lc}$, $d_{lm}$) for the respective lattice points. The initial $17^3$ ink amount set are optimized by means of processing that will be described subsequently and may therefore be generated in whichever way in the initial stage.

Thereafter, in step S330, the profile creation section PD6 acquires the evaluation coefficient $E_P$ and weighting coefficients $w_1$ to $w_5$ which were set in step S200. In the following step S340, the initial ink amount sets ($d_c$, $d_m$, $d_y$, $d_k$, $d_g$, $d_{lc}$, $d_{lm}$) are sequentially optimized. More specifically, the ink amount sets ($d_c$, $d_m$, $d_y$, $d_k$, $d_g$, $d_{lc}$, $d_{lm}$) which minimize the evaluation function $E_P$ which represents the overall print performance for each lattice point are sequentially calculated. For example, ink amount sets are moved locally from the initial ink amount set positions in the ink amount space and, thereupon, the ink amount sets which minimize the evaluation function $E_P$ are calculated for the respective lattice points.

As a result, the positions of the lattice points in the ink amount space are corrected in the direction of minimizing the evaluation function $E_P$. In addition, the ink amount sets are moved locally in the same manner from the revised positions and, thereupon, ink amount sets which minimize the evaluation function $E_P$ are calculated for each of the lattice points. By repeatedly executing such processing (200 times, for example), the lattice points can be optimized to create lattice points for which the evaluation function $E_P$ for each of the lattice points is ultimately extremely small (the overall print performance is high). The optimization of the lattice points may be completed by performing the above processing a prescribed number of times or the optimization of the lattice points may be completed in view of the fact that the value of the evaluation function $E_P$ is less than a predetermined threshold value.

Although the evaluation function $E_P$ must be calculated for the ink amount sets ($d_c$, $d_m$, $d_y$, $d_k$, $d_g$, $d_{lc}$, $d_{lm}$) which are sequentially updated in the optimization processing, by utilizing the respective converters RC, CC, GC, and SC (described subsequently) at such time, the spectral reflectivity $R(\lambda)$, graininess index GI, color constancy index CII, smoothness degree evaluation index SI, color difference $\Delta E$, and total ink amount which correspond with each of the ink amount sets ($d_c$, $d_m$, $d_y$, $d_k$, $d_g$, $d_{lc}$, $d_{lm}$) are sequentially calculated and the evaluation function $E_P$ is determined. The spectral printing model converter RC and color converter CC predict colors (L*a*b*) based on the print paper and observation light source which are set in step S210 also when performing optimization. In this embodiment, the method of lattice point optimization which is disclosed in US Publication Application No. 2006/176529 can also be applied. In this case, virtual power in a direction for which the evaluation function $E_P$ in the ink amount space is 0 may be made to act on each of the lattice points and the positions of the lattice points in the ink amount space may be made to converge in a steady state as a result of this force.

When each of the lattice points are optimized as mentioned earlier, in step S350, the colors (L*a*b*) which correspond with the ink amount sets ($d_c$, $d_m$, $d_y$, $d_k$, $d_g$, $d_{lc}$, $d_{lm}$) of the optimized lattice points are calculated by means of the spectral printing model converter RC and color converter CC. Here also, the spectral printing model converter RC and color converter CC predict the colors (L*a*b*) based on the print paper (glossy paper) and observation light source (D65 light) which are set in step S210. Further, the profile creation section PD6 creates the ink profile IP which describes the relationship between the L*a*b* values and the ink amount sets ($d_c$, $d_m$, $d_y$, $d_k$, $d_g$, $d_{lc}$, $d_{lm}$) which correspond with one another.

In step S360, the profile creation section PD6 creates the color conversion profile CP on the basis of the ink profile IP. As shown in FIG. 12, the color conversion profile CP is a profile which converts the image data represented by the colors of the respective pixels in the sRGB color space into the image data of the ink amount space in the printer 20, for example. Because the relationship (sRGB profile SP) of the sRGB color space with the CIELAB color space is decided on the basis of the CIE standard, the relationship between the RGB values of the sRGB color space and the ink amount sets ($d_c$, $d_m$, $d_y$, $d_k$, $d_g$, $d_{lc}$, $d_{lm}$) is specified by the L*a*b* values of the respective lattice points prescribed by the ink profile IP and a profile can be created. In addition, when the relationship between the RGB values of the sRGB color space and the ink amount sets ($d_c$, $d_m$, $d_y$, $d_k$, $d_g$, $d_{lc}$, $d_{lm}$) is specified, a color conversion profile which performs color correction may be created by intentionally supplying correction amounts. The sRGB profile SP desirably undergoes optimization using the smoothness degree evaluation index SI (See US Publication Application No. 2006/176529).

Because there is a difference between the gamut of the sRGB color space in the CIELAB color space and the color reproduction gamut of the printer 20, gamut mapping is suitably performed. In cases where the color reproduction gamut of the printer 20 by the ink set which is used is narrower than the sRGB color space in the gamut mapping, colors outside the color reproduction gamut and inside the sRGB color space are compressed (transformed) to within the color reproduction gamut of the printer 20. However, in this embodiment, except for cases where the ignore button is pushed in step S180, because it is confirmed by means of the ink set setting processing of step S100 that the colors represented by the respective pixels of the print target image data lie within the color reproduction gamut of the printer 20 when CMYKGlclm is used, the print result of the print target image data is able to minimize the effects of the color compression in the gamut mapping. In addition, if the ink set with the largest scope in the color reproduction gamut is selected as the optimal ink set in step S160, the effects of the color compression of the gamut mapping can be suppressed further. The profile creation section PD6 appends a header which specifies the print paper (glossy paper) and observation light source (D65 light) to the created color conversion profile CP and stores the header in the HDD 11.

In the color conversion profile CP created as mentioned earlier, the relationship between the RGB values in the sRGB color space and the ink amount sets ($d_c$, $d_m$, $d_y$, $d_k$, $d_g$, $d_{lc}$, $d_{lm}$) in the ink amount space can be prescribed for a plurality of lattice points ($17^3$, for example). In addition, in the color conversion profile CP, the lattice points which have ink amount sets ($d_c$, $d_m$, $d_y$, $d_k$, $d_g$, $d_{lc}$, $d_{lm}$) for which the graininess, color constancy, tonality, color reproduction gamut, and running costs have favorable values which correspond with each of the weighting coefficients $w_1$ to $w_5$ are prescribed. This is because, by performing the optimization described earlier, the coordinates ($d_c$, $d_m$, $d_y$, $d_k$, $d_g$, $d_{lc}$, $d_{lm}$) of the lattice points in the ink amount space move gradually to a range where the graininess, color constancy, tonality, color reproduction gamut, and running costs are favorable and the coordinates can ultimately be moved to optimal positions. Although the color range of the colors to be reproduced in the printed image does not change greatly, it is said that the freedom of the range for the ink amount space which corresponds with the color range is much larger. That is, even when one L*a*b* value is decided in the CIELAB color space, the ink amount sets ($d_c$, $d_m$, $d_y$, $d_k$, $d_g$, $d_{lc}$, $d_{lm}$) with which the L*a*b* values implement a reproducible print result with a certain light source cannot be uniquely decided.

For example, because the Kink and CMY ink can be printed with a split run, the same L*a*b* values can also be reproduced by changing the split run ratio with a certain light source. The same is also true for the relationships between the C ink, lc ink, M ink, and lm ink. For example, the split run ratio between the K ink and CMY ink cannot be uniquely determined by deciding the L*a*b* values in the CIELAB color space. However, the graininess stands out when thick K ink is produced in a highlight area. Therefore, from the perspective of the graininess, it may be said that the ink amount sets ($d_c$, $d_m$, $d_y$, $d_k$, $d_g$, $d_{lc}$, $d_{lm}$) can be optimized by suppressing $d_k$ with respect to the L*a*b* values in the highlight area. On the other hand, if the ink amount $d_k$ of K ink is suppressed and the component gray of the CMY ink the spectral reflectivity of which is not flat is used in many instances, the color constancy is impaired. Thus, it is difficult to fulfill a plurality of performance elements at the same time and prescribing split run rules which establish such common ground in a multidimensional ink amount space is substantially impossible. In addition, in cases where it is possible to establish which performance elements are to be emphasized and for how long, the split run rules are even more difficult to prescribe.

In contrast, by optimizing the respective lattice points by using the evaluation function $E_P$ which constitutes the index of the overall print performance in which the degrees of importance of the respective performance elements are set by means of the weighting coefficients $w_1$ to $w_5$, suitable ink amount sets ($d_c$, $d_m$, $d_y$, $d_k$, $d_g$, $d_{lc}$, $d_{lm}$) can be found without prescribing the above complicated split run rules. Since the weighting coefficients $w_1$ to $w_5$ are set in accordance with the user's designation, a color conversion profile CP which allows the print performance suited to the aims of the user can be implemented. When the color conversion profile CP can be created, color conversion processing and printing processing are executed in step S400.

A-5. Color Conversion and Printing

Figure 13:
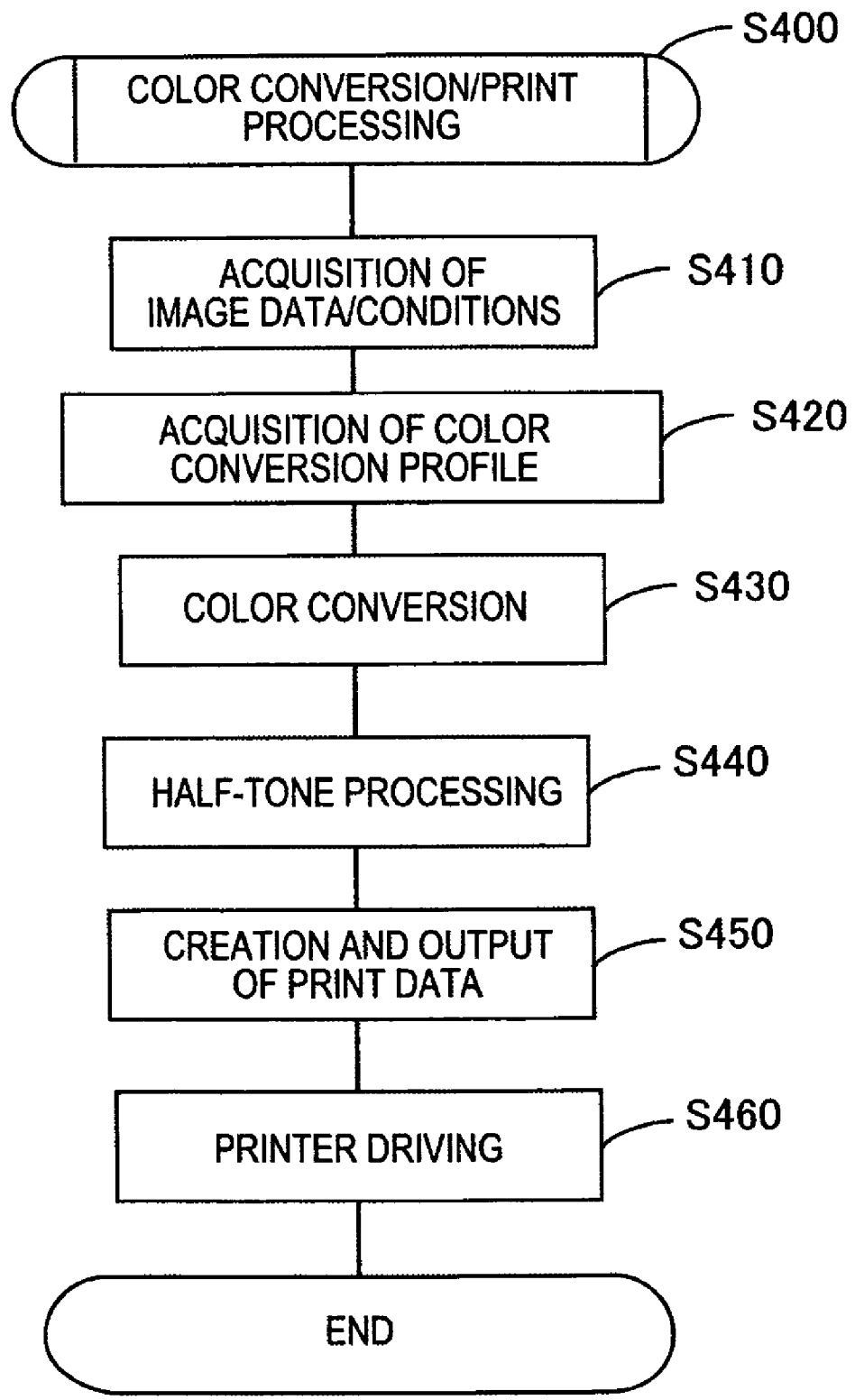
FIG. 13 is a flowchart which shows the flow of color conversion processing and print processing.

FIG. 13 shows the flow of the color conversion processing and print processing. In step S410, the color conversion section PD7 acquires the image data designated as the print target in step S110 and the print paper and observation light source designated in step S210. In this embodiment, designations are made such that the sRGB image data are printed on glossy paper and observed using D65 light. In step S420, a color conversion profile CP which corresponds with the image data and print paper and observation light source thus acquired in step S410 is acquired from the HDD 11. According to this embodiment, the color conversion profile CP is acquired because the color conversion profile CP is created in step S260. In cases where the profile creation guideline setting section PD5 judges in step S150 that there is no need to create the color conversion profile CP, the existing color conversion profile CP is recognized as existing in the HDD 11 in step S420 and, therefore, the existing color conversion profile CP is acquired from the HDD 11.

In step S430, the image data of the print target acquired in step S410 is color-converted by the color conversion profile CP acquired in step S420. More specifically, the RGB values of the respective pixels of the image data are acquired and the ink amount sets ($d_c$, $d_m$, $d_y$, $d_k$, $d_g$, $d_{lc}$, $d_{lm}$) associated with the RGB values are sequentially acquired by the color conversion profile CP. The color conversion profile CP prescribes relationships only for representative lattice points but the ink amount sets ($d_c$, $d_m$, $d_y$, $d_k$, $d_g$, $d_{lc}$, $d_{lm}$) corresponding with the RGB values between lattice points can be determined by interpolation. When the ink amount sets of all of the pixels ($d_c$, $d_m$, $d_y$, $d_k$, $d_g$, $d_{lc}$, $d_{lm}$) are determined by means of interpolation, the respective pixels can be converted into the color conversion data represented by the ink amount sets ($d_c$, $d_m$, $d_y$, $d_k$, $d_g$, $d_{lc}$, $d_{lm}$).

According to the present invention, the ink set used for printing is acquired, a color conversion profile CP which conforms to the ink set is selected, and, in the absence of a conforming color conversion profile CP, the profile creation section PD6 creates a color conversion profile CP which corresponds with the ink set. Therefore, there is no need to prepare a color conversion profile CP which corresponds with all of the ink sets which can be considered beforehand (in cases where thirteen types of inks are installed in eight cartridge holders 21a, 21a . . . , 7098 types of ink sets can be considered) and printing using optional ink sets used by the user is made possible.

In the next step S440, the print data generation section PD8 acquires color conversion data which comprise pixel information of the ink amount sets ($d_c$, $d_m$, $d_y$, $d_k$, $d_g$, $d_{lc}$, $d_{lm}$) and executes half-tone processing on the color conversion data. Here, dither processing and error diffusion and so forth can be applied to convert the color conversion data into half-tone data which have information specifying whether the respective pixels perform ink discharge/do not perform ink discharge or discharge large dots/discharge medium-sized dots/discharge small dots/do not discharge any dots. In step S450, the print data generation section PD8 acquires half-tone data and executes rasterizing processing on the basis of the half-tone data.

More specifically, print data are generated which specify which ink nozzles are charged with the respective pixels of the half-tone data with main scanning/secondary scanning timing. In step S450, the print data generation section PD8 outputs print data created by appending control information for the printer 20 such as the printing conditions to the printer 20 via the USB I/F 14. In step S460, the firmware FW of the printer 20 acquires print data and generates a drive signal for the paper feed mechanism 27, carriage motor 28, and print head 29 on the basis of the print data. As a result, ink in amounts which correspond with the ink amount sets ($d_c$, $d_m$, $d_y$, $d_k$, $d_g$, $d_{lc}$, $d_{lm}$) which each pixel of the color conversion data comprises can be discharged in each position on the print paper and a print image can be formed.

The proportions (cover ratios) of the respective inks of the printed image and the proportions of the ink discharge amounts during printing reflect the ink amount sets ($d_c$, $d_m$, $d_y$, $d_k$, $d_g$, $d_{lc}$, $d_{lm}$) for the lattice points prescribed by the color conversion profile CP. Hence, as per the ink amount sets ($d_c$, $d_m$, $d_y$, $d_k$, $d_g$, $d_{lc}$, $d_{lm}$) of the lattice points prescribed by the color conversion profile CP, printing and a printed image which satisfy the overall print performance desired by the user can be obtained. That is, ink running costs which correspond with the expectations of the user can be implemented during printing and the user is able to implement the graininess, color constancy, tonality, and color reproduction gamut which correspond with expectations for the printed image following printing. In addition, as mentioned earlier, because printing can be performed by means of the ink set which the user desires to use, printing which is highly satisfactory to the user can be implemented. The user can be notified of the ink set which allows a color reproduction gamut which is suitable for the printing of the image data of the print target to be secured and, therefore, mistakes by the user in the ink selection can be prevented.

B. Various Converters

B-1. Spectral Printing Model Converter

The spectral printing model converter CC is a converter which predicts the spectral reflectivity R ($\lambda$) in a case where printing is performed by means of optional ink amount sets ($d_c$, $d_m$, $d_y$, $d_k$, $d_{lc}$, $d_{lm}$, $d_{lk}$, $d_{llk}$, $d_{dy}$, $d_r$, $d_o$, $d_g$, $d_b$) which can be used by the printer 20 of this embodiment. The spectral printing model converter CC actually prints a color patch on the basis of a plurality of representative points in the ink amount color space, reads spectral reflectivity data RD obtained by measuring the spectral reflectivity R ($\lambda$) from the HDD 11, and uses these data. Further, by making a prediction based on the Cellular Yule-Nielsen Spectral Neugebauer Model which uses the spectral reflectivity data RD, the spectral reflectivity R ($\lambda$) for a case where printing is performed accurately by means of optional ink amount sets ($d_c$, $d_m$, $d_y$, $d_k$, $d_{lc}$, $d_{lm}$, $d_{lk}$, $d_{llk}$, $d_{dy}$, $d_r$, $d_o$, $d_g$, $d_b$).

Figure 14:
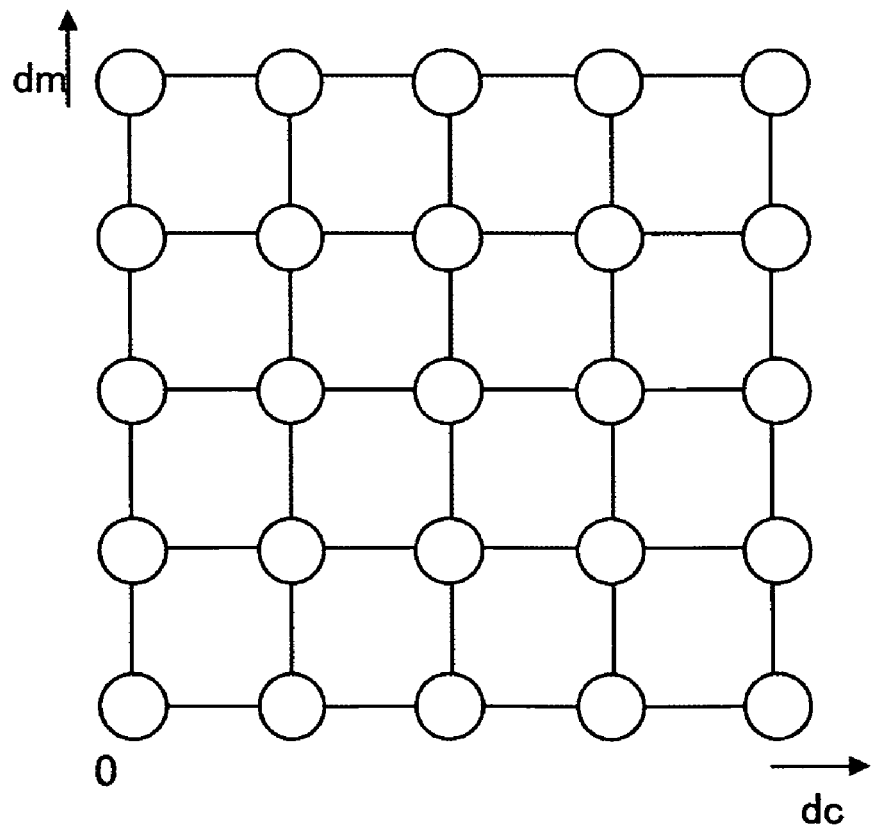
FIG. 14 shows spectral reflectivity data.

FIG. 14 shows the spectral reflectivity data D. As shown in FIG. 14, the spectral reflectivity data D constitute a lookup table which describes the spectral reflectivity R ($\lambda$) obtained by actually printing/measuring the ink amount sets ($d_c$, $d_m$, $d_y$, $d_k$, $d_{lc}$, $d_{lm}$, $d_{lk}$, $d_{llk}$, $d_{dy}$, $d_r$, $d_o$, $d_g$, $d_b$) for a plurality of lattice points in the ink amount space (although there are thirteen dimensions in this embodiment, only plane CM is shown in order to simplify the diagram). For example, the lattice points of a 5 by 5 grid in which the ink amount axis is equally divided are produced. Here, $5^{13}$ lattice points are produced and there is a need to print/measure a color patch of a huge volume. However, in reality, because there are restrictions on the number of inks which can be installed at the same time in the printer 20 and restrictions on the ink duty which can be discharged at the same time, the number of lattice points which are printed/measured is restricted.

In addition, by actually printing/measuring only some of the lattice points and estimating the spectral reflectivity R ($\lambda$) on the basis of the spectral reflectivity R ($\lambda$) of the lattice points which actually undergo printing/measurement for the other lattice points, the number of color patches which are actually printed/measured may be reduced. The spectral reflectivity data RD must be prepared for each type of print paper which can be printed by the printer 20. This is because, strictly speaking, the spectral reflectivity R ($\lambda$) is determined by the reflectivity of the print paper and the spectral transmittance of the ink film formed on the print paper, and the surface properties of the print paper (upon which the ink film formation is dependent) and the effect of the reflectivity are significant. Because a spectral reflectometer is required in the creation of the spectral reflectivity data RD, a general user is unable to prepare the spectral reflectivity data RD, the manufacturing source of the printer 20 prepares the spectral reflectivity data RD beforehand and these data are stored in HDD 11 through the installation of the printer driver PD. An estimate using the Cellular Yule-Nielsen spectral Neugebauer model which uses the spectral reflectivity data RD will be described next.

The spectral printing model converter CC executes the estimate using the Cellular Yule-Nielsen spectral Neugebauer model which uses the spectral reflectivity data RD in accordance with the request of the profile creation section PD6. In this estimate, estimate conditions are first acquired from the profile creation section PD6 and these estimate conditions are set. More specifically, the spectral reflectivity data RD which are created for the print paper designated by the user are set for use in the estimate in step S210 and the spectral reflectivity data RD are set for an estimate of the ink set designated by the user in step S210. In this embodiment, because glossy paper is selected, spectral reflectivity data RD created by printing color patch on the glossy paper are set. Because CMYKGlclm is set as the ink set, the restriction ($d_{lk}=d_{llk}=d_{dy}=d_r=d_o=d_b=0$) is added so that the ink amounts $d_{lk}$, $d_{llk}$, $d_{dy}$, $d_r$, $d_o$ which exclude those for CMYKGlclm are not used. As a result, the work space for the estimate of the spectral printing model converter CC is substantially kept to six dimensions.

When setting of the spectral reflectivity data RD as detailed hereinabove is possible, the estimate of the spectral reflectivity R ($\lambda$) when printing by means of optional ink amount sets ($d_c$, $d_m$, $d_y$, $d_k$, $d_g$, $d_{lc}$, $d_{lm}$) is performed. The ink amount sets ($d_c$, $d_m$, $d_y$, $d_k$, $d_g$, $d_{lc}$, $d_{lm}$) which are to be estimated are input sequentially from the profile creation section PD6. For example, in the optimization of the step S340, ink amount sets of the respective lattice points ($d_c$, $d_m$, $d_y$, $d_k$, $d_g$, $d_{lc}$, $d_{lm}$) are sequentially input and the ink amount sets ($d_c$, $d_m$, $d_y$, $d_k$, $d_g$, $d_{lc}$, $d_{lm}$) for the respective lattice points which are finally optimized are input. The spectral printing model converter CC hands over the estimated spectral reflectivity R ($\lambda$) to the color converter CC in accordance with the input of the ink amount sets ($d_c$, $d_m$, $d_y$, $d_k$, $d_g$, $d_{lc}$, $d_{lm}$) from the profile creation section PD6.

The Cellular Yule-Nielsen spectral Neugebauer model is based on the well-known spectral Neugebauer model and the Yule-Nielsen model. In the following description, a model which represents the case of three types of inks for CMY for the sake of simplifying the description will be described. However, the same model is easily expanded to a model which employs optional ink sets which include CMYKlclm and ORGBdylkllk of this embodiment. Furthermore, the Cellular Yule-Nielsen spectral Neugebauer model references Color Res Appl 25, 4 to 19, 2000 and R Balasubramanian, Optimization of the spectral Neugebauer model for printer characterization, J. Electronic Imaging 8(2), 156 to 166 (1999).

FIG. 15 shows the spectral Neugebauer model. In the spectral Neugebauer model, the spectral reflectivity R ($\lambda$) of the printed matter when printing is performed using optional ink amount sets ($d_c$, $d_m$, $d_y$) is provided by Equation (2) below.

[Equation 2]

$$R(\lambda) = a_w R_w(\lambda) + a_c R_c(\lambda) + a_m R_m(\lambda) + \\ a_y R_y(\lambda) + a_r R_r(\lambda) + a_g R_g(\lambda) + a_b R_b(\lambda) + a_k R_k(\lambda) \quad (2)$$

$$a_w = (1 - f_c)(1 - f_m)(1 - f_y)$$
$$a_c = f_c(1 - f_m)(1 - f_y)$$
$$a_m = (1 - f_c)f_m(1 - f_y)$$
$$a_y = (1 - f_c)(1 - f_m)f_y$$
$$a_r = (1 - f_c)f_m f_y$$
$$a_g = f_c(1 - f_m)f_y$$
$$a_b = f_c f_m(1 - f_y)$$
$$a_k = f_c f_m f_y$$

Here, $a_i$ is the area ratio of the ith area and $R_i$ ($\lambda$) is the spectral reflectivity of the ith area. The subscript i signifies an inkless area (w), an area (c) with only cyan ink, an area (m) with only magenta ink, an area (y) with only yellow ink, an area (r) in which magenta ink and yellow ink are discharged, an area (g) in which yellow ink and cyan ink are discharged, an area (b) in which cyan ink and magenta ink are discharged, and an area (k) in which the three inks of CMY are discharged respectively. In addition, $f_c$, $f_m$, and $f_y$ are the proportions of the area which are covered by these inks when only one type of the respective CMY inks is discharged (referred to as 'ink area coverage').

The ink area coverages $f_c$, $f_m$, and $f_y$ are provided by the Murray-Davis model shown in FIG. 15B. According to the Murray-Davis model, the ink area coverage $f_c$ of cyan ink, for example, is an nonlinear function of the cyan ink amount $d_c$ and the ink amount $d_c$ can be converted into the ink area coverage $f_c$ by means of a one-dimensional lookup table, for example. The reason that the ink area coverages $f_c$, $f_m$, and $f_y$ are nonlinear functions of the ink amounts $d_c$, $d_m$, and $d_y$ is that, although the ink expand adequately in cases where a small amount of ink is discharged per unit area, the area covered by the ink barely increases due to polymerization of the ink in cases where a large amount of ink is discharged. The same is also true for the other types of MY inks.

When a Yule-Nielsen model which relates to spectral reflectivity is applied, Equation (2) may be rewritten as Equation (3a) or (3b) below:

[Equation 3]

$$R(\lambda)^{1/n} = a_w R_w(\lambda)^{1/n} + a_c R_c(\lambda)^{1/n} + a_m R_m(\lambda)^{1/n} + a_y R_y(\lambda)^{1/n} + \\ a_r R_r(\lambda)^{1/n} + a_g R_g(\lambda)^{1/n} + a_b R_b(\lambda)^{1/n} + a_k R_k(\lambda)^{1/n} \quad (3a)$$

$$R(\lambda) = \left\{ \begin{array}{c} a_w R_w(\lambda)^{1/n} + a_c R_c(\lambda)^{1/n} + a_m R_m(\lambda)^{1/n} + \\ a_y R_y(\lambda)^{1/n} + a_r R_r(\lambda)^{1/n} + \\ a_g R_g(\lambda)^{1/n} + a_b R_b(\lambda)^{1/n} + a_k R_k(\lambda)^{1/n} \end{array} \right\}^n \quad (3b)$$

Here, n is a predetermined coefficient of 1 or more and can be set to n=10, for example. Equations (3a) and (3b) are equations which represent the Yule-Nielsen Spectral Neugebauer Model.

The Cellular Yule-Nielsen Spectral Neugebauer Model which is adopted by this embodiment divides the ink amount space of the Yule-Nielsen Spectral Neugebauer Model into a plurality of cells.

FIG. 16A shows an example of the cell division of the Cellular Yule-Nielsen Spectral Neugebauer Model. Here, in order to simplify the description, cell division in a two-dimensional ink amount space which includes the two axes of the ink amounts $d_c$ and $d_m$ of CM ink is represented. Because the ink area coverages $f_c$ and $f_m$ have a unique relationship with the ink amounts $d_c$ and $d_m$ in the Murray-Davis model, the axes which represent the ink area coverages $f_c$ and $f_m$ can also be considered. The white circles are the grid points (called 'nodes') of the cell division and the two-dimensional ink amount (area coverage) space is divided into nine cells C1 to C9. The ink amount sets ($d_c$, $d_m$) which correspond with the respective nodes are ink amount sets which correspond with the lattice points prescribed by the spectral reflectivity data RD. That is, the spectral reflectivity R ($\lambda$) of the respective nodes can be obtained by referencing the spectral reflectivity data RD. Hence, the spectral reflectivity R ($\lambda$)$_{00}$, R ($\lambda$)$_{10}$, R ($\lambda$)$_{20}$ ... R ($\lambda$)$_{33}$ of the respective nodes can be obtained from the spectral reflectivity data RD.

In reality, according to this embodiment, cell division is performed in a CMYKGlclm seven-dimensional ink amount space and the coordinates of the respective nodes are represented by seven-dimensional ink amount sets ($d_c$, $d_m$, $d_y$, $d_k$, $d_g$, $d_{lc}$, $d_{lm}$). Further, the spectral reflectivity R ($\lambda$) of the lattice points which correspond with the ink amount sets ($d_c$, $d_m$, $d_y$, $d_k$, $d_g$, $d_{lc}$, $d_{lm}$) of the respective nodes are obtained from the spectral reflectivity data RD (for glossy paper). The spectral reflectivity data RD describes the spectral reflectivity R ($\lambda$) for the ink amount sets ($d_c$, $d_m$, $d_y$, $d_k$, $d_{lc}$, $d_{lm}$, $d_{llk}$, $d_{llk}$, $d_{dy}$, $d_r$, $d_o$, $d_g$, $d_b$) of the lattice points in the ink amount space. Therefore, the spectral reflectivity R ($\lambda$) of the nodes designated by the CMYKGlclm ink amount sets ($d_c$, $d_m$, $d_y$, $d_k$, $d_g$, $d_{lc}$, $d_{lm}$) can also be provided.

FIG. 16B shows the relationship between the ink area coverage $f_c$ and the ink amount $d_c$ which are used in the cell division model. Here, the range 0 to $d_{cmax}$ of the ink amount of one type of ink is also divided into three segments and a virtual ink area coverage $f_c$ which is used in the cell division model is determined by means of a nonlinear curve which increases monotonously from 0 to 1 for each segment. The ink area coverages $f_m$ and $f_y$ are also determined in the same way as for the other inks.

FIG. 16C shows a method of calculating the spectral reflectivity R ($\lambda$) incases where printing is performed by means of optional ink amount sets ($d_c$, $d_m$) in cell C5 in the center of FIG. 16A. The spectral reflectivity R ($\lambda$) in a case where printing is performed by means of ink amount sets ($d_c$, $d_m$) is supplied by Equation (4) below.

[Equation 4]

$$R(\lambda) = \left(\sum a_i R_i(\lambda)^{1/n}\right)^n \quad (4)$$
$$= (a_{11}R_{11}(\lambda)^{1/n} + a_{12}R_{12}(\lambda)^{1/n} + a_{21}R_{21}(\lambda)^{1/n} + a_{22}R_{22}(\lambda)^{1/n})^n$$
$$a_{11} = (1-f_c)(1-f_m)$$
$$a_{12} = (1-f_c)f_m$$
$$a_{21} = f_c(1-f_m)$$
$$a_{22} = f_c f_m$$

Here, the ink area coverages $f_c$, $f_m$ of Equation (4) have values which are given by the graph in FIG. 16B. Furthermore, the spectral reflectivity R $(\lambda)_{11}$, $(\lambda)_{12}$, $(\lambda)_{21}$, and $(\lambda)_{22}$ which correspond with the four nodes which surround cell C5 can be acquired by referencing the spectral reflectivity data RD. As a result, all of the values which constitute the right side of Equation (4) can be estimated and the spectral reflectivity R $(\lambda)$ in a case where printing is performed by means of optional ink amount sets $(d_c, d_m)$ can be calculated as the calculation result. By sequentially shifting the wavelength $\lambda$ to a visible light bandwidth, the spectral reflectivity R $(\lambda)$ of the visible light bandwidth can be obtained. If the ink amount space is divided into a plurality of cells, the spectral reflectivity R $(\lambda)$ of the sample can be calculated more accurately than in a case where the ink amount space is not divided. The estimated spectral reflectivity R $(\lambda)$ is output to the color converter CC. The color converter CC will be described next.

B-2. Color Converter

Figure 17:
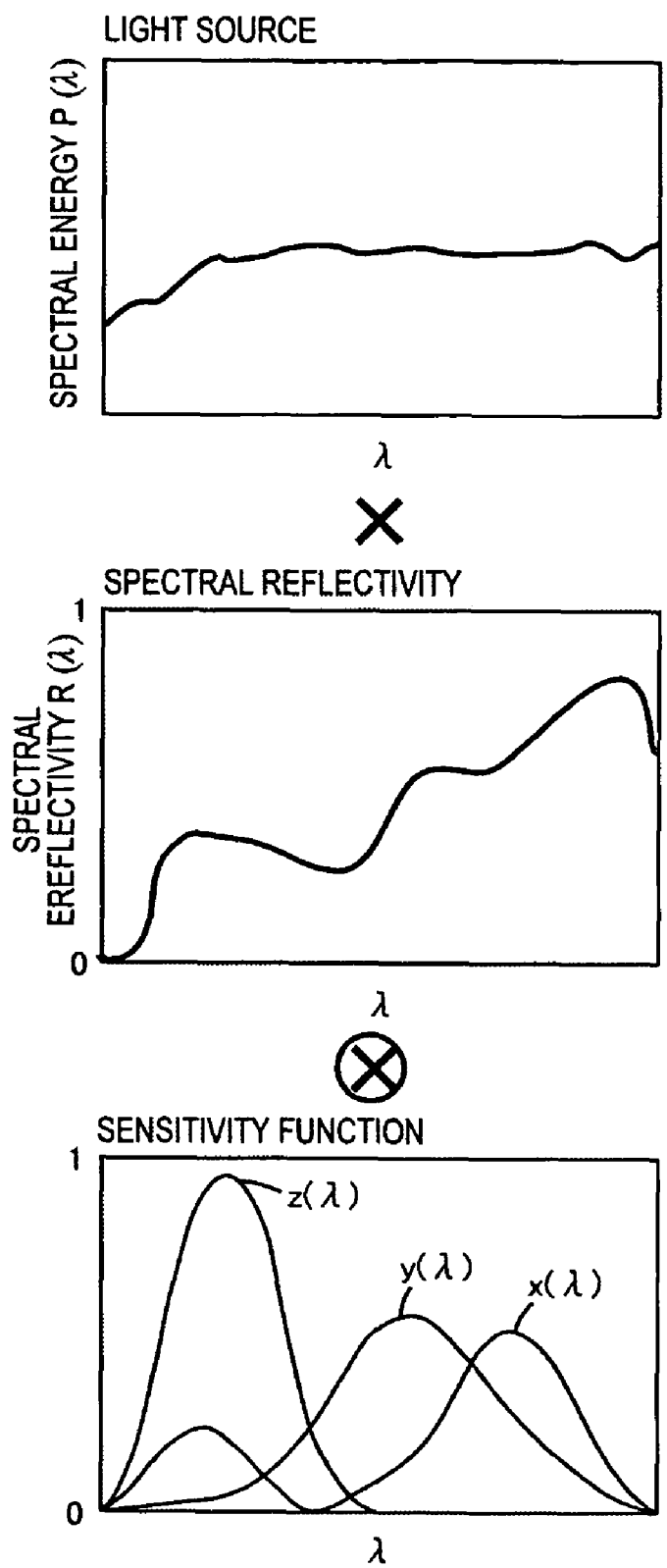
FIG. 17 shows an aspect in which colors are specified from the spectral reflectivity.

FIG. 17 schematically shows processing in which the color converter CC specifies colors on the basis of the spectral reflectivity R $(\lambda)$. In FIG. 17, the spectral printing converter RC estimates the spectral of the reflected light reflected by the printed matter by multiplying the spectral of the desired light source by the respective wavelengths $\lambda$ of the estimated spectral reflectivity R $(\lambda)$. According to this embodiment, because D65 light is set, the spectral of D65 light is used. Thereafter, sensitivity functions $x(\lambda)$, $y(\lambda)$, and $z(\lambda)$ of the desired observation conditions are convolved in the spectral of the reflected light and the tristimulus values XYZ are calculated by performing normalization. According to this embodiment, unless especially indicated otherwise, the tristimulus values XYZ are calculated under the observation condition of a CIE1931 2° observer. Furthermore, the color converter CC calculates the L*a*b* values of the CIELAB table color system by applying a CIE standard conversion equation to the tristimulus values XYZ. Thus, the profile creation section PD6 is able to obtain the L*a*b* values in a case where printing is carried out by means of ink amount sets $(d_c, d_m, d_y, d_k, d_g, d_{lc}, d_{lm})$ for which an estimate is being requested by sequentially using the spectral printing converter RC and color converter CC and the L*a*b* values thus estimated can be handed over to the smoothness converter SC.

In addition, the color converter CC is able to perform color adaptive conversion of the tristimulus values XYZ. For example, by applying the color adaptive conversion based on CIECAT02 to the tristimulus values XYZ which are calculated by means of D50 light, the appearance of the colors under D50 light can be converted into the L*a*b* values represented by the corresponding colors of D65 light, for example. The CIECAT02 appears in "The CIECAM02 Color Appearance Model", Nathan Moroney et al., IS&T/SID Tenth Color Imaging Conference, pp. 23 to 27, and "The performance of CIECAM02", Changjun Li et al., IS&T/SID Tenth Color Imaging Conference, pages 28 to 31, for example. However, another optional form of color adaptive conversion such as the Van Kries' color adaptive predictive equation can be employed for the color adaptive conversion.

The L*a*b* values obtained by the color adaptive conversion are represented as $CV_{L1 \to Ls}$. The subscript 'L1→Ls' signifies the fact that the appearance of the colors under the light source L1 is the L*a*b* values represented by the corresponding colors of the standard light source Ls. The color converter CC determines the color values $CV_{L1 \to Ls}$ and $CV_{L2 \to Ls}$ in which the appearance of at least two or more comparison light sources L1 and L2 is represented by the corresponding colors of the standard light source Ls and calculates the color constancy index CII on that basis. In this embodiment, because the observation light source is set as D65 light in step S210, the standard light source Ls is D65 light. The comparison light sources L1 and L2 are D50 light and F11 light, for example. The color constancy index CII can be calculated by Equation (5) below, for example.

[Equation 5]

$$CII = \left[\left(\frac{\Delta L^*}{2S_L}\right)^2 + \left(\frac{\Delta C^*_{ab}}{2S_C}\right)^2 + \left(\frac{\Delta H^*_{ab}}{S_H}\right)^2\right]^{1/2} \quad (5)$$

See Billmeyer and Saltzman's Principles of Color Technology, 3rd edition, John Wiley & Sons, Inc, 2000, page 129 and pages 213 to 215 for the color constancy index CII. The right side of Equation (5) sets the values of the coefficients kL and kC of the brightness and chroma of the CIE 1994 color differential equation as 2 and corresponds to the color difference $\Delta E^*94$ (2:2) in which the value of the color phase coefficient kH is set as 1. In the CIE 1994 color differential equation, the coefficients SL, Sc, SH of the denominator of the right side of Equation (5) are supplied by Equation (6) below.

[Equation 6]

$$S_L = 1$$

$$S_C = 1 + 0.045 C^*_{ab}$$

$$S_H = 1 + 0.015 C^*_{ab} \quad (6)$$

Another equation can also be employed as the color equation used in calculating the color constancy index CII. The color constancy index CII is defined as the difference in the appearance of a color when a certain color patch is observed under different observation conditions. Therefore, an ink amount set with which the color constancy index CII is small during printing is preferable in that the difference in the appearance of the color under different observation conditions is small. Furthermore, the color values $CV_{L1 \to Ls}$ and $CV_{L2 \to Ls}$ are the measured color values of the corresponding colors under the same standard observation conditions and, therefore, a color constancy index CII which constitutes the color difference is a value which represents the difference in the appearance of the color fairly accurately. The color converter CC returns the color constancy index CII to the profile creation section PD6 together with the L*a*b* values in a case where printing is carried out by means of ink amount sets $(d_c, d_m, d_y, d_k, d_g, d_{lc}, d_{lm})$ for which the profile creation section PD6 requests an estimate. The graininess converter GC and the reference thereof will be explained next.

B-3. Graininess Converter

The graininess converter GC performs processing to estimate the graininess index GI in a case where printing is performed by means of the ink amount sets $(d_c, d_m, d_y, d_k, d_{lc},$ $d_{lm}$, $d_{lk}$, $d_{llk}$, $d_{dy}$, $d_r$, $d_o$, $d_g$, $d_b$) for which the profile creation section PD6 requires an estimate and to return the graininess index GI to the profile creation section PD6. In this embodiment, because only CMYKGlclm are used for printing, the other ink amounts are always input such that $d_{lk}=d_{llk}=d_{dy}=d_r=d_o=d_b=0$. By structuring the neural network NNG such that the ink amounts $d_c$, $d_m$, $d_y$, $d_k$, $d_{lc}$, $d_{lm}$, $d_{lk}$, $d_{llk}$, $d_{dy}$, $d_r$, $d_o$, $d_g$, $d_b$ of all of the inks which can be used for printing can be input, it is possible to obtain a graininess index GI of an optional ink set which is used for printing by inputting the ink amounts of the inks which cannot be used for printing as 0.

Figure 18:
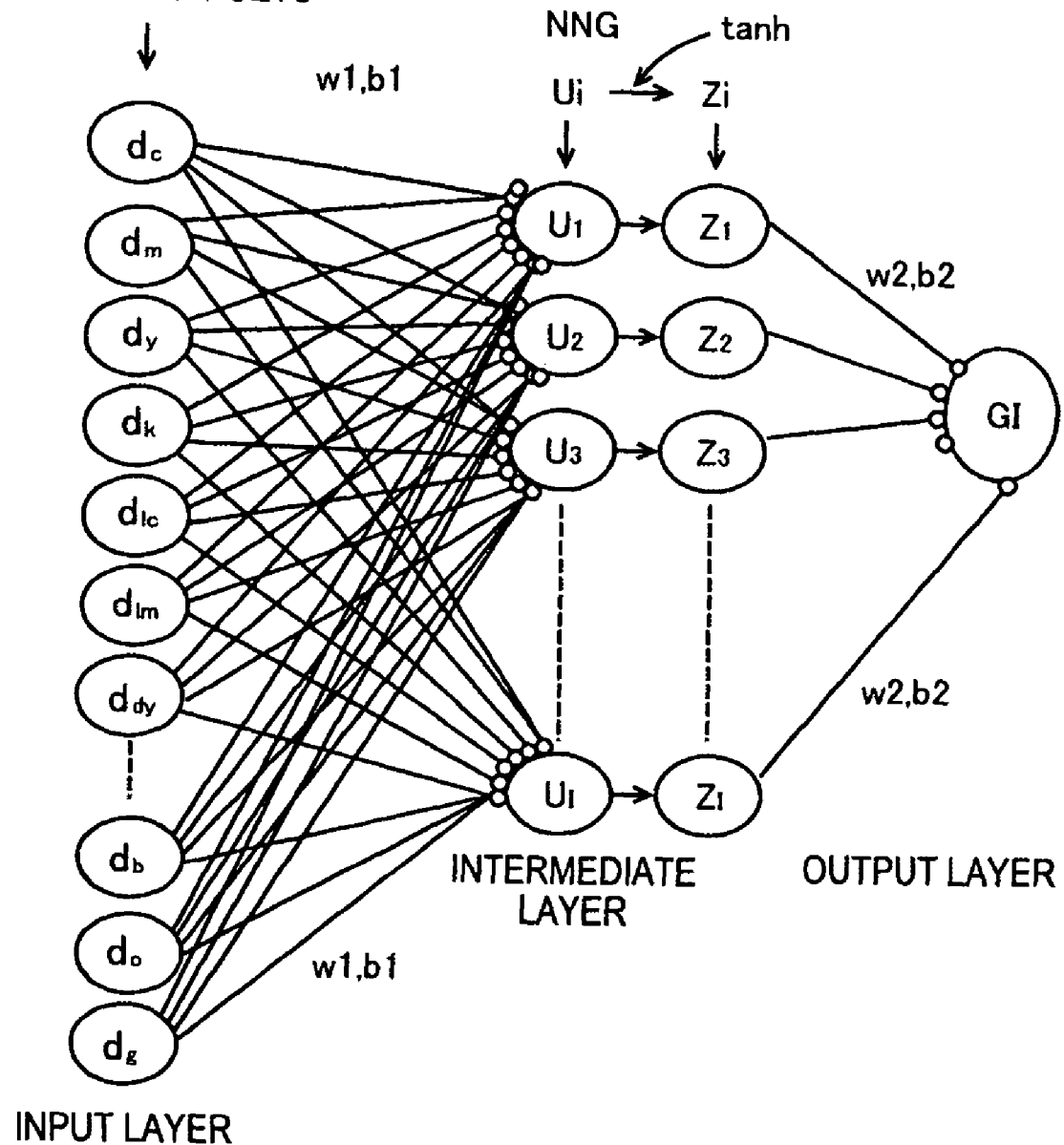
FIG. 18 illustrates a neural network NNG.

FIG. 18 shows the neural network NNG. In FIG. 18, the ink amounts $d_c$, $d_m$, $d_y$, $d_k$, $d_{lc}$, $d_{lm}$, $d_{lk}$, $d_{llk}$, $d_{dy}$, $d_r$, $d_o$, $d_g$, $d_b$ of the respective inks can be input to the input layer of the neural network NNG and the graininess index GI can be output via the output layer. If a neural network NNG of this kind is pre-prepared in HDD11, the ink amount sets ($d_c$, $d_m$, $d_y$, $d_k$, $d_g$, $d_{lc}$, $d_{lm}$) which are requested by the profile creation guideline setting section PD5 can be converted into the graininess index GI and the graininess index GI can be returned to the profile creation guideline setting section PD5.

The graininess index GI is defined by Equation (7) below.
[Equation 7]

$$GI = a_L \int \sqrt{WS(u)} VTF(u) du \quad (7)$$

With regard to the graininess index GI, see Makoto Fujino, Image Quality Evaluation of Inkjet Prints, Japan Hardcopy '99, pages 291 to 294, for example. $a_L$ in Equation (7) is the brightness correction term, WS (u) is the winner spectrum of the image, VTF is the visual spatial frequency characteristic, and u is the spatial frequency.

In Equation (7) above, the graininess index GI is calculated by obtaining the power spectral of the spatial waves that exist in the image by subjecting the image data obtained by using a scanner or the like to pick up an image of a color patch to an image plane-related Fourier Transform, and by convolving the visual spatial frequency characteristic VTF in this power spectral. The image data used are generally brightness image data. Thus, the graininess index GI is said to be a value that is obtained by accumulating the magnitudes of the brightness spatial waves which exist in the color patch with respect to all of the spatial frequencies by considering the weighting of the spatial frequency characteristic VTF. Therefore, the conspicuous graininess can be quantified. The contribution to the graininess index GI of the overall brightness is diminished by the brightness correction term $a_L$.

Learning data for the neural network NNG are prepared by actually printing a color patch for representative ink amount sets ($d_c$, $d_m$, $d_y$, $d_k$, $d_{lc}$, $d_{lm}$, $d_{lk}$, $d_{llk}$, $d_{dy}$, $d_r$, $d_o$, $d_g$, $d_b$) in the ink amount space of the CMYKlclmlkllkORGBdy ink which can be used for printing and by calculating the graininess index GI by means of Equation (7). Further, the number of layers which determine the structure of the neural network NNG shown in FIG. 18, the number of intermediate units, the respective weighting coefficients, and the bias are sequentially optimized by performing learning by means of the learning data. In the learning of the neural network NNG, the back provocation method is generally used. In this embodiment, a neural network NNG to which ink amounts of all types can be input is illustrated but an individual neural network NNG may also be prepared for each ink set. In this embodiment, the neural network NNG is prepared in the HDD 11 by installing the printer driver PD and the graininess converter GC can be employed. The graininess converter GC returns the graininess index GI thus obtained to the profile creation section PD6.

B-4. Smoothness Converter

FIG. 19 schematically illustrates the smoothness degree evaluation index SI calculated by the smoothness converter SC. The smoothness converter SC performs processing to evaluate the degree of smoothness of color in the CIELAB color space when printing is performed by means of the ink amount set of the lattice points for which an estimate is required by the profile creation section PD6. In this embodiment, the smoothness converter SC receives an input, from the color converter CC, of the L*a*b* values when the colors, in the event of printing by means of the ink amount set for the lattice points for which an estimate is required by the profile creation section PD6, are observed by means of D65 light and the degree of smoothness in the CIELAB color space of the L*a*b* values is quantified.

In FIG. 19, o [outlined dot] indicates the positions of a plurality of lattice points in the CIELAB space and ● [solid black dot] indicates the lattice point being focused on among the lattice points (the lattice points of the calculation target of the evaluation function $E_P$). Suppose that the positional vector of a lattice point which is being considered is Lp and the positional vectors of six lattice points which are adjacent to this lattice point are $L_{a1}$ to $L_{a6}$, the smoothness degree evaluation index SI is expressed by Equation (8) below.

[Equation 8]

$$SI = |(\vec{L_{a1}} - \vec{L_p}) + (\vec{L_{a2}} - \vec{L_p})| + \\ |(\vec{L_{a3}} - \vec{L_p}) + (\vec{L_{a4}} - \vec{L_p})| + |(\vec{L_{a5}} - \vec{L_p}) + (\vec{L_{a6}} - \vec{L_p})| \quad (8)$$

The smoothness degree evaluation index SI is such that the distances from the lattice point being considered to the mutually opposite vectors are equal and the value of the smoothness degree evaluation index SI grows smaller as the direction moves in the opposite direction.

As shown in FIG. 19B, there tends to be a smooth disposition of lattice points in the CIELAB color space as the lines linking the adjacent lattice points (lines passing through the lattice points indicated by vectors $L_{a1}$ to vector $L_P$ to vector $L_{a2}$ or the like) approach straight lines and the lattice points are disposed uniformly. Hence, the smaller the smoothness degree evaluation index SI shown in Equation (8) becomes, the higher the degree of smoothness can be made. The L*a*b* values of the CIELAB color space can be obtained by sequentially converting the ink amount sets of this embodiment ($d_c$, $d_m$, $d_y$, $d_k$, $d_g$, $d_{lc}$, $d_{lm}$) by means of the spectral printing model converter RC and color converter CC and the smoothness degree evaluation index SI can therefore be a function of the ink amount set. A favorable tonality can be expected with a smaller smoothness degree evaluation index SI. Upon calculating the smoothness degree evaluation index SI, the smoothness converter SC returns the smoothness degree evaluation index SI to the profile creation section PD6.

Figure 20:
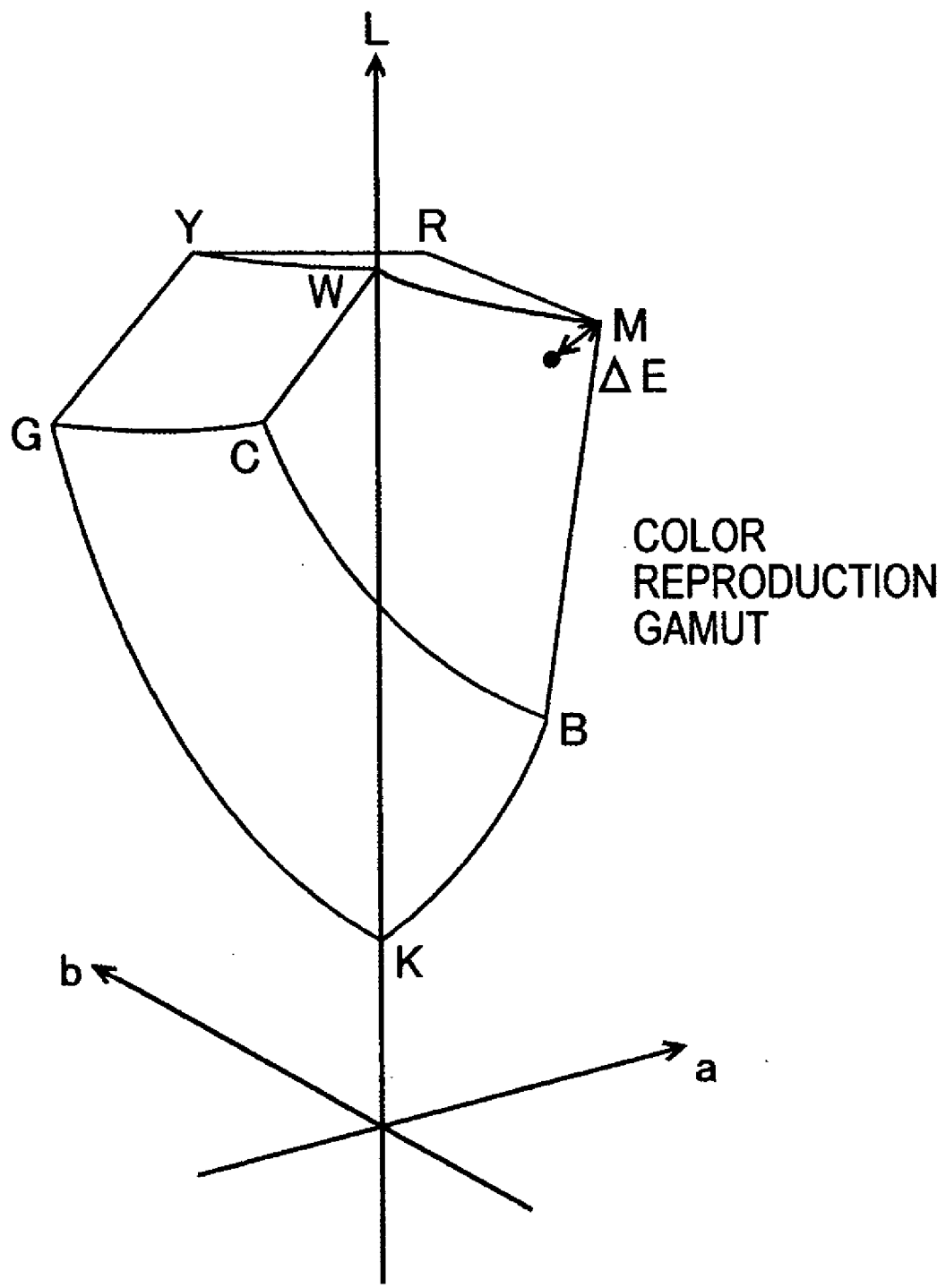
FIG. 20 is a graph that shows the color reproduction gamut of the printer.

In FIG. 20, the color reproduction gamut in a case where the printer 20 performs printing by means of the ink set CMYKGlclm of this embodiment is shown in the CIELAB color space. As shown in FIG. 20, the color reproduction gamut of the printer 20 is determined beforehand by the hardware specifications and the ink set and so forth of the printer 20 and the colors can be reproduced within this range. The smoothness converter SC acquires the color reproduction gamut from the color reproduction gamut data GD of the HDD 11 and calculates the color difference ΔE between the L*a*b* values on the outside face, edge line and apex of the color reproduction gamut and the L*a*b* values of some of the lattice points calculated by the color converter CC.

The target of the calculation of the color difference ΔE exists on the outer edge of the ink amount space among the lattice points and color difference ΔE=0 is true for the lattice points on the inside. This is because it is thought that the L*a*b* values, which are produced by converting the lattice points which exist on the outer edge of the ink amount space by means of the spectral printing model converter RC, similarly exist on the outer edge of the CIELAB space. As a result, the color displacement, to the outer face, edge line and apex of the color reproduction gamut which can be reproduced by the printer 20, of the L*a*b* values obtained by using the spectral printing model converter RC and the color converter CC to sequentially convert those lattice points among the lattice points which exist on the outer edge of the ink amount space can be quantified. The smoothness converter SC returns the color difference ΔE to the profile creation section PD6 and the color difference ΔE is used in the optimization.

The color difference ΔE is added to the evaluation function $E_P$ of Equation (1) and, by performing optimization (step S340) to minimize the evaluation function $E_P$, the lattice points of the outer edge of the CIELAB color space move so as to approach the outer face, edge line, and apex of the color reproduction gamut. As a result, the ink profile IP and color conversion profile CP which maximize usage of the color reproduction gamut can be created. However, because the color difference ΔE=0 for the lattice points on the inside of the color reproduction gamut, there are no restrictions on the specified colors in the CIELAB color space. However, by performing optimization to minimize the evaluation function $E_P$ to which the smoothness degree evaluation index SI is added, the respective lattice points can be moved so that there is a smooth distribution of the lattice points inside the color reproduction gamut.

According to this embodiment, because the fact that the colors represented by the respective pixels of the image data of the print target are confirmed using the ink set setting processing of step S100 to be within the color reproduction gamut of the printer 20 when CMYKGlclm are used, except for cases where the ignore button is pushed in step S180, the colors represented by the respective pixels of the image data of the print target basically fall within the color reproduction gamut illustrated in FIG. 20. Thus, in the optimization of step S340, the lattice points in the CIELAB color space are optimized. In the CIELAB color space of FIG. 20, the lattice points cannot be made visible. However, at the same time as optimizing the lattice points in the CIELAB color space, the ink amount sets ($d_c$, $d_m$, $d_y$, $d_k$, $d_g$, $d_{lc}$, $d_{lm}$) are optimized so that the other graininess index GI, color constancy index CII and the ink running costs are favorable in step S340.

C. Summary and Modified Example

C-1. Modified Example 1

As illustrated in section A, according to the present invention, the profile creation section PD6 creates a color conversion profile CP which corresponds with the ink set used for printing. Thereupon, because an ink set which has a color reproduction gamut containing colors represented by the respective pixels of the image data of the print target is selected and the color conversion profile CP is created for the ink set, the colors represented by the respective pixels of the image data of the print target can be accurately reproduced. Furthermore, according to the above embodiment, by receiving the image data of the print target from the user, a request regarding the print performance to the effect that the color reproduction gamut should be received for the colors represented by the pixels which the image data comprise is received intermittently. Therefore, the processing of step S110 in which a designation of the image data of the print target is received can be thought of as being equivalent to the processing executed by the request receiving means of the present invention. Likewise, the ink set setting section PD4 which selects an ink set so that a color reproduction gamut for the print performance can be secured can correspond to the selection section of the present invention.

According to the embodiment hereinabove, the color conversion profile CP thus created may be deleted by means of a user instruction. Furthermore, although color conversion is performed by using the color conversion profile CP created on the basis of the ink profile IP, the image data may also be converted into ink amount image data by using a source profile relating to the color space of the image data which are input as well as the ink profile IP. Further, the color conversion profile CP created according to the present invention is not limited to mentioning the relationship between the ink amounts and sRGB color space and may instead describe the relationship between the ink amounts and CIELAB color space (the ink profile IP in the above embodiment) or may describe the relationship between the ink amounts and XYZ color space or the relationship between the ink amounts and another color space. Further, because the binding force on the lattice points in step S340 with respect to the outer face, edge line, and apex of the color reproduction gamut weakens when the weighting $w_4$ is small, a color reproduction gamut which is represented by the ink profile IP that is actually created may also be considered as being narrower than a color reproduction gamut represented by the color reproduction gamut data GD. Therefore, at the moment where the ink profile IP is created, it may be confirmed that the color reproduction gamut of the ink profile IP is not also narrower than the color range of the colors represented by the respective pixels of the image data of the print target.

Figure 21:
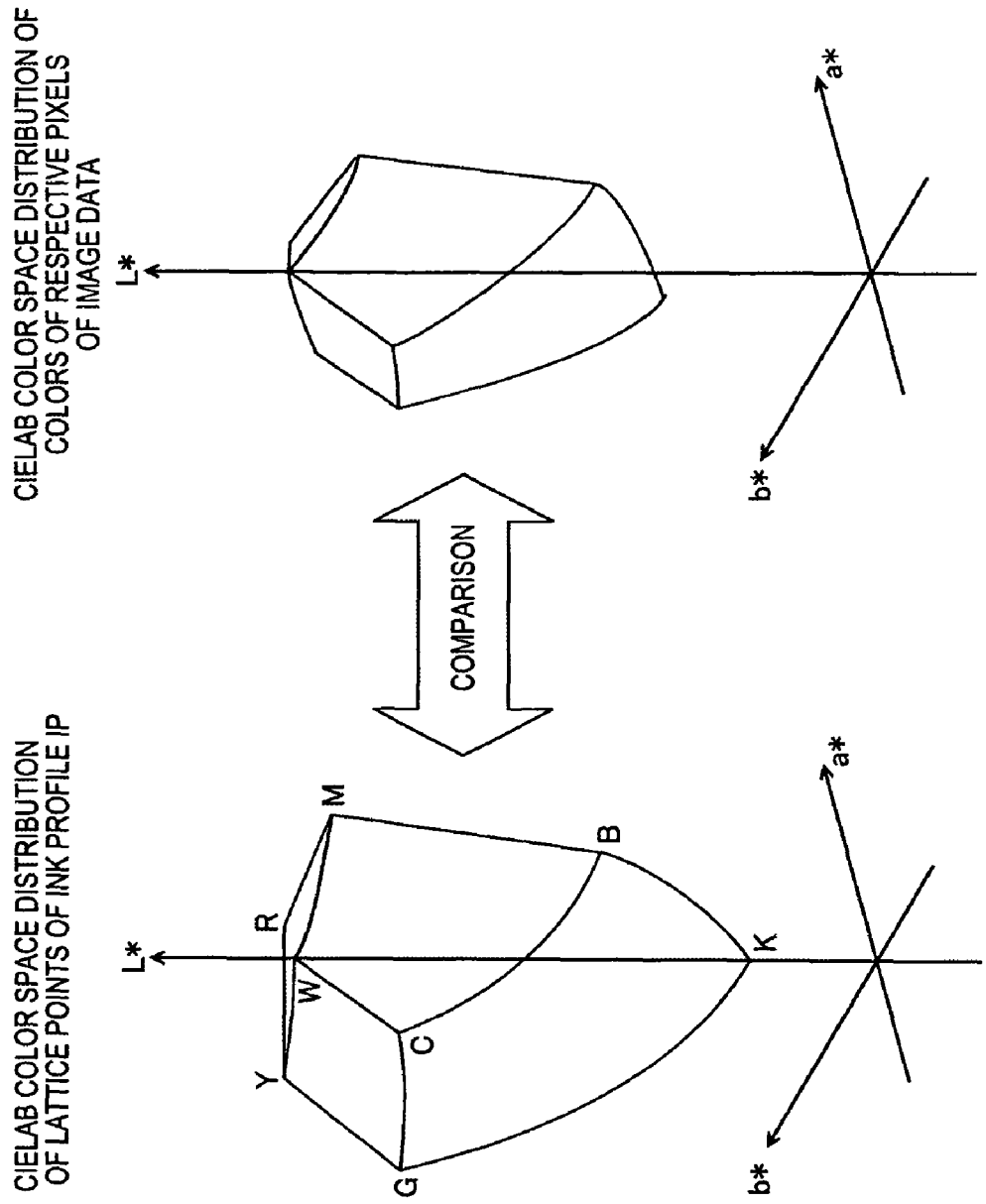
FIG. 21 is a graph which compares the ink profile and the color range of the image data.

FIG. 21 shows an aspect in which the distribution region of the lattice points of the optimized (following step S340) ink profile IP and the distribution region of the colors of the image data of the print target are compared using a CIELAB color space. As shown in FIG. 21, in cases where the distribution region of the lattice points of the ink profile IP that is actually created is wide, the colors of the image data of the print target can be adequately implemented. Conversely, in cases where the distribution region of the lattice points of the ink profile IP that is actually created is narrow, the weighting coefficient $w_4$ relating to the color reproduction gamut is revised upwards in order to permit the creation of an ink profile IP which maximizes usage of the color reproduction gamut of the current ink set and the ink profile IP is desirably re-created.

In the above embodiment, in the case of an ink set with which at least the color reproduction gamut of the printer 20 is wider than the color range of the image data, it is judged that the ink set is suitable for printing the image data. However, the requirements for judging an ink set as a suitable ink set may also be stricter. For example, it is also possible to select only those ink sets with which the color reproduction gamut of the printer 20 is slightly wider than the color space of the image data (sRGB color space in this embodiment) and has substantially the same shape as a suitable ink set. Thus, ink sets with which the color reproduction gamut of the printer 20 is wider than the color range of the image data can be filtered and the correction amounts of the colors close to the outer edge of the color reproduction gamut of gamut mapping can be suppressed. This is therefore effective in cases where the colors of the original image data colors are reproduced by the printer 20. In addition, in cases where a plurality of ink sets with which the cover ratio of the color reproduction gamut is 100% exist, these ink sets may be shown to the user so that a selection may be received. In addition, the weighting coefficients $w_1$ to $w_5$ are preset and the creation of the color conversion profile CP may be started at the point where an ink set with which the cover ratio of the color reproduction gamut is 100% is detected. In cases where only one ink set with which the cover ratio of the color reproduction gamut is 100% is detected, the creation of a color conversion profile CP for the ink set at that point in time may be started. However, in cases where a plurality of ink sets are detected, ink sets may be selected in a predetermined order of priority based on the cover ratio and the number of inks and the creation of a color conversion profile CP may be sequentially started.

Figure 22:
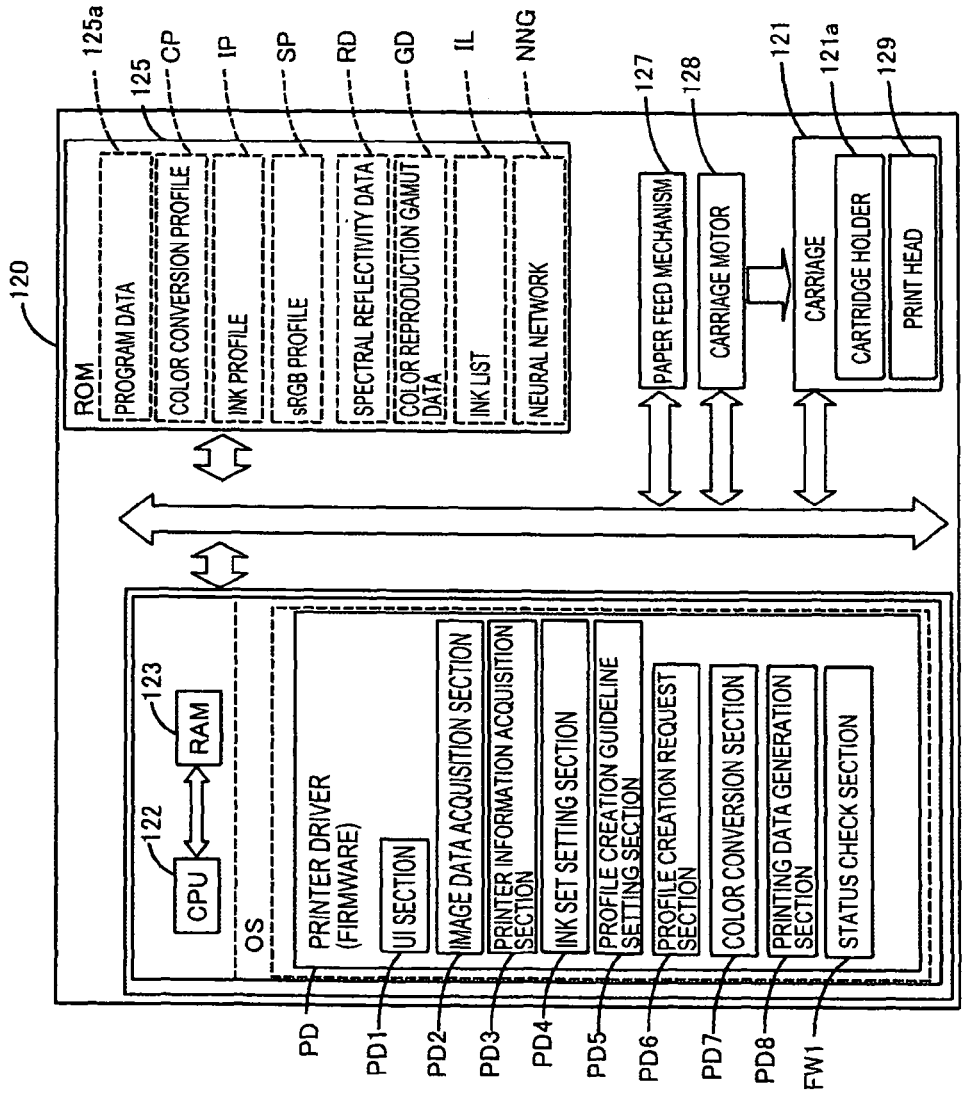
FIG. 22 is a block diagram which shows the constitution of a printing device according to a modified example.

FIG. 22 shows the constitution of a printer which constitutes the printing device that executes the printing control of the present invention. In FIG. 22, the constitution is such that the firmware FW of printer 120 executes the respective modules PD1 to PD8 of the printer driver. Further, the printer 120 is able to select an ink set which is suited to the image data designated as its own print target and use the selected ink set to perform printing by means of a suitable color reproduction gamut. Thus, the present invention can also be implemented by a direct printer which permits printing by the printer 120 unit.

C-2. Modified Example 2

Although an embodiment for selecting the ink set to be used in accordance with a request relating to the color reproduction gamut for the print performance was illustrated hereinabove, an ink set may also be selected in accordance with another second print performance-related request. For example, a user request relating to the graininess, tonality, and color constancy and so forth may be received and the ink set may be selected in accordance with this request. A modified example in which the ink set setting section PD4 selects the ink set to be used in accordance with a graininess-related user request will be described in detail hereinbelow.

Figure 23:
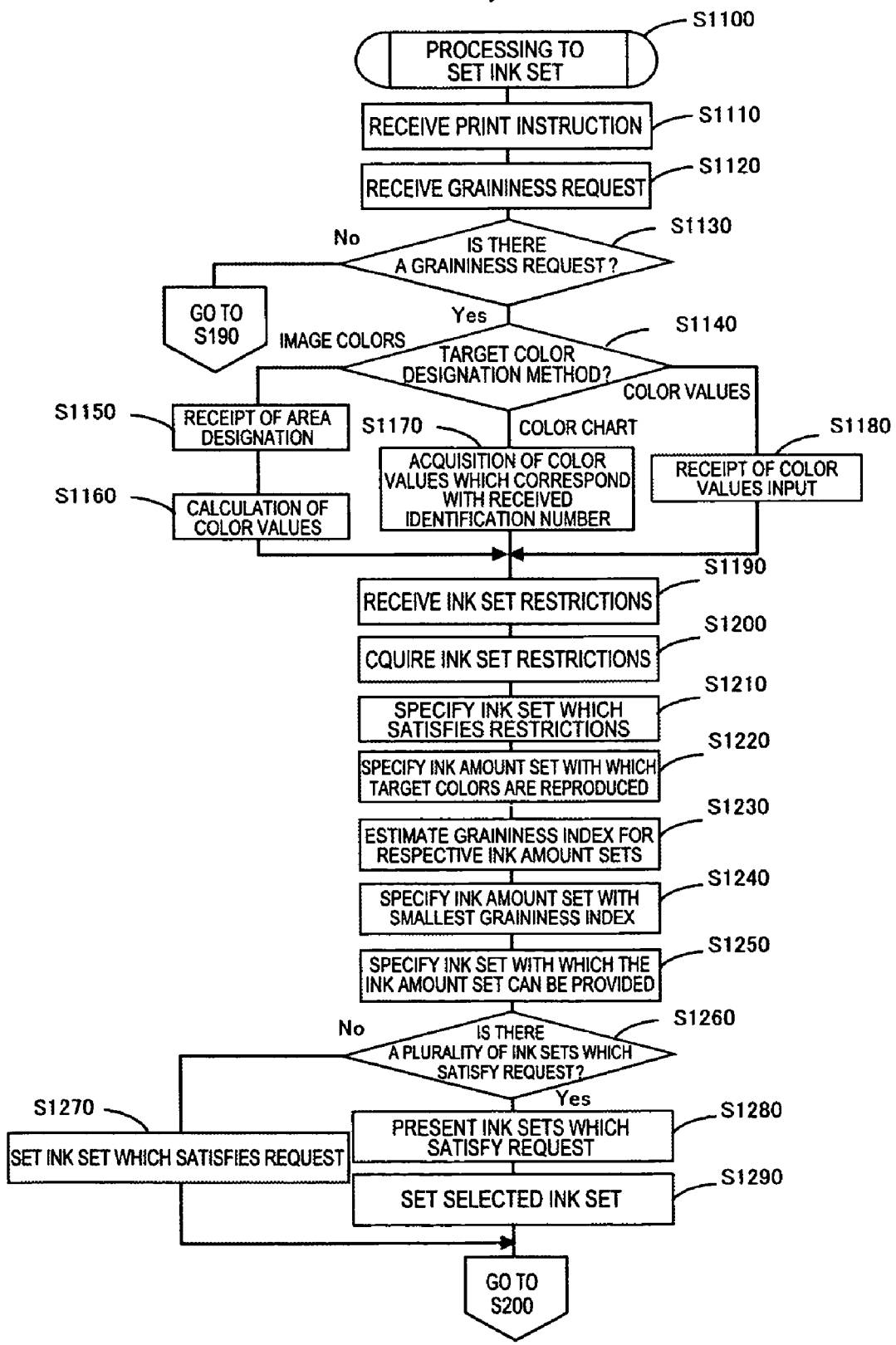
FIG. 23 is a flowchart of the ink set setting processing according to the modified example.

FIG. 23 shows the flow of the ink set setting processing according to this modified example. In FIG. 23, in step S1110, the UI section PD1 displays a UI screen on the display 30 and receives a print instruction via the keyboard 40a and mouse 40b, and the image data acquisition section PD2 acquires the image data of the print target from the HDD 11 or another application program, for example. In the following step S1120, a display for the purpose of receiving a request with regard to the graininess is received from the user. The ink set setting section PD4 which executes the ink set setting processing constitutes the request receiving means and the selecting means of the present invention.

FIG. 24 shows an example of the UI screen which is displayed in step S1120. In FIG. 24, a message "Use ink which suppresses graininess?" is displayed and check boxes for issuing an instruction with regard to this request ("Yes", "No") are provided. When a check mark is entered in a check box, the check box which receives the selection of a to c below is valid for the method of designating the target colors:
  a. designate by means of image color;
  b. designate by means of color chart;
  c. designate by means of color value.

In step S1120, the respective user designations of the UI screen are acquired in response to clicking the apply button. In step S1130, it is judged whether the "Yes" of the check box which corresponds with the message "use ink that suppresses graininess?" has been checked and, in cases where "No" has been checked, the processing advances to step S190 of the ink set setting processing (FIG. 4) of this embodiment. That is, printing is carried out by using the currently installed ink set. However, in cases where the "Yes" check box has been checked, it is judged in step S1140 whether any of a. to c. above has been designated. Here, in cases where a. has been designated, a UI screen for the purpose of receiving a designation of the target colors according to the colors of the image is displayed in step S1150.

FIG. 25 shows a UI screen which is displayed in step S1150. In FIG. 25, the image preview area is provided and a predetermined sample image is displayed in the image preview area. This sample image may be image data which are designated beforehand as the print target or may be image data of the sample stored in the HDD 11 at the time the printer driver PD is installed. Furthermore, a sample which is a scenery photograph, for example, may be used and the user may be allowed to choose what kind of sample image is displayed. The user may be asked whether a sample which is a photograph of a person is acceptable. A message "Please select the color for which the graininess is to be suppressed using a pointer" is displayed on the UI screen and a pointer whose position moves in accordance with the operation of the mouse 40b in the image preview area is displayed.

Furthermore, a rectangular area can be designated by means of the drag and drop positions of the pointer. In step S1160, the average value of the colors contained in the rectangular area thus designated is calculated. Here, the video I/F 15 acquires the RGB values of the rectangular area output to the display 30 and converts the RGB values into L*a*b* values by using an ICC profile (sRGB profile SP) of the display 30. Furthermore, the average value of the L*a*b* values for the rectangular area is acquired for the target color. Accordingly, the target color can be intuitively designated. For example, in cases where the graininess of a hollow is to be suppressed, the area of the hollow may simply be designated. The area for designating the target color is not limited to a rectangle. A circle or the like could also be adopted and a plurality of areas could be designated.

However, in cases where b. has been designated in step S1120, a UI screen for the purpose of receiving an identification number of the color patch (color swatch) is displayed in step S1170. The identification number of the color patch is a number unique to each color patch that is printed on a color chart (not shown) together with each color patch and the colors of the color patch designated by the user can be uniquely specified by inputting the identification number. In the HDD 11, a database which stores the relationship between the identification numbers and color values (L*a*b* values) for each color patch is provided and the L*a*b* values designated by the user can be acquired as the target colors by receiving the identification number. The color chart is provided beforehand by the manufacturer of the printer 20 and a plurality of color patches to which colors are assigned are arranged in order to encompass the whole of the color reproduction gamut which can be reproduced by the printer 20. The color chart according to this modified example is provided as the print medium but a plurality of color patches can be presented to the user or a color chart may be displayed on the display 30 so that a designation by means of the mouse 40b may be received.

However, in cases where c. is designated in step S1120, a UI screen (text box) for the purpose of making a designation by entering color values (L*a*b* values) in step S1180 is displayed and the L*a*b* values thus entered are acquired as target colors. As mentioned earlier, when L*a*b* values are acquired as target colors in steps S1160, S1170, and S1180, the UI screen for receiving restrictions on the ink which is used in step S1190 is displayed.

FIG. 26 shows the UI screen which is displayed in step S1190. In FIG. 26, the message "Does the ink which is to be used exist?" is displayed and a check box for the purpose of making an instruction which corresponds with the message is provided. When a check mark is entered in the check box, the check box for entering the check mark is valid for all the inks which can be used. In addition, the message "Does ink which should not be used exist?" is displayed and a check box for the purpose of making an instruction which corresponds with the message is also provided. When a check mark is entered in the check box, the check box for entering the check mark is valid for all the inks which can be used. Accordingly, those inks which the user does not want to possess can be excluded from the usage target. In step S1200, the user instructions with respect to the UI screen are acquired.

In step S1210, an ink set which can be used is specified based on the restrictions acquired in step S1200. For example, in cases where K ink is designated as an ink which is to be used and lkllkdy ink is designated as ink which should not be used, an ink set ($2^9$) which compulsorily includes K ink and is constituted by a combination of CMYKORGBlclm inks excluding lkllkdy inks is specified. In step S1220, the ink amount set which constitutes the L*a*b* values of the target colors acquired in steps S1160, S1170, and S1180 is specified. When specifying the ink amount set, the color converter CC and spectral printing model converter RC described in section B are utilized. In section B, a procedure which involves calculating the spectral reflectivity R ($\lambda$) from an optional ink amount set and calculating the L*a*b* values with the light source by having the spectral distribution of a predetermined light source act on the spectral reflectivity R ($\lambda$) was described. However, an ink amount set with which the L*a*b* values of the target colors can be reproduced is calculated in step S1220.

For example, all of the ink amount sets which can be supplied by the respective ink sets specified in step S1210 are sequentially substituted into the spectral printing model converter RC and color converter CC and only the ink amount set with the L*a*b* values of the target colors is specified. Thereupon, restrictions are made such that the K ink designated as the ink which is to be used by the user is compulsorily used ($d_k \neq 0$) and such that the lkllkdy ink designated as ink which should not be used by the user is not used ($d_{lk}=d_{llk}=d_{dy}=0$). The light source which is used in step S1220 may be designated by the user or a standard light source may be applied. In step S1230, the ink amount set specified in step S1220 is substituted into the graininess converter GC (neural network NNG) and the graininess index GI in a case where printing is performed using the ink amount set is calculated.

FIG. 27 shows the graininess index GI calculated in step S1230 as a list. In FIG. 27, a plurality of ink amount sets with which the L*a*b* values of the target colors can be reproduced are specified and the graininess index GI is calculated for each of the ink amount sets. In step S1240, the ink amount set with which the graininess index GI has a minimum value among the listed ink amount sets is specified. As a result, the ink amount set with which the graininess is suppressed the most among the respective ink amount sets with which the L*a*b* values of the target colors can be reproduced can be specified. Here, the graininess index GI for the print performance for the respective ink amount sets listed in FIG. 27 can be estimated and the graininess index GI for a case where printing is performed by means of an ink set which includes at least ink with a non-zero ink amount in the respective ink amount sets can be estimated. In step S1250, an ink set capable of providing the ink amount set with which the graininess is suppressed the most specified in step S1240 is specified. For example, in cases where the ink amount set with which the graininess is suppressed the most is constituted by CMYKlclm ink amounts which are not zero as per FIG. 27, an ink set which includes at least CMYKlclm as constituent elements is equivalent to an ink set which is capable of providing the ink amount set.

The printer 20 can have eight ink cartridges 22 installed therein at the same time and, therefore, an ink set obtained by adding inks of 0 to 2 optional types to CMYKlclm is specified as an ink set which is capable of providing the above ink amount set. However, restrictions are made such that the ink which is designated as ink which should not be used by the user in step S1190 is excluded from the constituent elements of the ink set. In the above example, lkllkdy inks are excluded from the constituent elements of the ink set. In step S1260, it is judged whether there is a plurality of ink sets specified in step S1250 and, in cases where there is a singular ink set, the ink set specified in step S1250 is selected as the ink set which is ultimately used as is for the printing (step S1270). For example, in cases where the ink amount set which suppresses the graininess the most is constituted by non-zero ink amounts of eight types, the ink amount set can be provided by means of a singular ink set. However, in cases where there is a plurality of ink sets which are specified in step S1250, a UI screen which serves to allow the user to select any one of the ink sets selected in step S1250 is displayed (step S1280). Further, in step S1290, the designation of an ink set by the user is received and the designated ink set is ultimately selected as the ink set which is to be used for printing.

When the ink set is ultimately selected as described hereinabove, processing to set the color conversion profile creation guideline (step S200 in FIG. 8) is executed as per the above embodiment and processing to create a color conversion profile CP (step S300 in FIG. 11) is sequentially executed. Thus, printing can be executed by the ink set which is capable of suppressing the graininess with respect to the target colors designated by the user. Furthermore, because the restrictions on the ink which the user would like to use/would not like to use can also be mirrored, an ink set which is in line with the intent of the user can be used for printing.

An embodiment which filters the ink amount sets which can be reproduced by the target colors beforehand and selects the ink amount set which is capable of suppressing the graininess the most from among these ink amount sets was described hereinabove. However, the proximity to the target colors and degree of graininess suppression may be evaluated at the same time, and an ink amount set with which the proximity to the target colors and the degree of graininess suppression are both favorable may be specified. The evaluation function $E_P$ supplied by Equation (1) above is an index value which makes it possible to simultaneously evaluate the graininess, color constancy, tonality, color reproduction gamut, and running costs but the proximity to the target colors and the degree of graininess suppression can be evaluated at the same time by utilizing the evaluation function $E_P$. More specifically, in Equation (1), the weighting coefficients $w_2$, $w_3$, $w_5$ of the color constancy, tonality, and running costs are all set at 0 while the weighting coefficients $w_1$ and $w_4$ for the graininess and color reproduction gamut respectively are both set at 0.5, for example. Furthermore, in order to secure the color reproduction gamut in section B-4, the color difference $\Delta E$ is used for the colors on the outer face and edge line of the color reproduction gamut. However, the color difference $\Delta E$ is used for the designated target colors for which the user wishes to suppress the graininess. It can accordingly be evaluated, using the evaluation function $E_P$, whether the colors in a case where printing is carried out by means of an optional ink amount set ($\phi$) are close to the target colors.

When the evaluation function $E_P$ can be prepared as outlined hereinabove, the ink amount set which minimizes the evaluation function $E_P$ is calculated. For example, the optimum solution for the ink amount set for minimizing the evaluation function $E_P$ can be calculated by means of the conjugate gradient method. Accordingly, the ink amount set for which the proximity to the target colors and the degree of suppression of the graininess are both favorable can be calculated. As mentioned earlier, when the ink amount set of the minimum solution can be calculated, an ink set which allows the ink amount set to be provided is specified. The processing here is the same as that of step S1250. That is, an ink set which includes at least ink with non-zero values as the constituent elements in the ink amount set obtained as the minimum solution may be specified. In this case also, when a plurality of ink sets are specified, the user may be allowed to select any of the ink sets. Thus, the processing can be simplified by using the evaluation function $E_P$ to simultaneously evaluate the proximity to the target colors and the degree of graininess suppression.

Further, in cases where the user asks to suppress the graininess in the ink set setting processing, it can be judged that the user expects printing in which the graininess is suppressed and it is desirable to set a creation guideline for a color conversion profile CP which emphasizes graininess in the processing to set a color conversion profile creation guideline which is executed next (step S200 in FIG. 8). In other words, the weighting coefficient $w_1$ for the graininess is desirably also set at a large value for the evaluation function $E_P$ that is used in the processing to create the color conversion profile CP (step S300 in FIG. 11). As a result, an ink set which allows the graininess to be suppressed for the target colors is selected and a color conversion profile CP which permits printing using the ink amount set which permits graininess suppression can be created with this ink set. In addition, because the colors for which graininess is to be emphasized are also made clear through designation of target colors, the graininess may be suppressed particularly in the vicinity of the target colors. For example, if the graininess weighting coefficient $w_1$ is large in a color range in the vicinity of a target color in the evaluation function $E_P$ which is used in the processing to create the color conversion profile CP (step S300 in FIG. 11), a color conversion profile CP which permits graininess suppression particularly in the vicinity of the target color can be created.

Although ink set setting processing in a case where a print performance request to the effect that the graininess is to be suppressed is received is illustrated hereinabove, an ink set can also be selected on the basis of another print performance request. For example, a print performance request to the effect that the tonality is to be improved can be received and an ink amount set which minimizes the evaluation function $E_P$ which sets the weighting function $w_3$ for the tonality at a large value can be found and an ink set which allows the ink amount set to be provided can also be selected. Likewise, an ink set which places an emphasis on the running costs and color constancy and so forth can also be selected.

According to the embodiment hereinabove, although the color conversion profile CP which totally satisfies a variety of performance requests may be created, any consideration of the performance elements can also be omitted. By reducing the performance elements to be considered, optimization can be performed at high speed and the color conversion profile CP can be created quickly. Conversely, other performance elements can also be added. Furthermore, the weighting coefficients $w_1$ to $w_5$ need not necessarily be adjustable as per the embodiment above and may instead be fixed at values which achieve moderate balance. Although this embodiment illustrates a constitution where all of the hardware and software resources required for the printing control of the present invention are provided in the computer 10, some of the resources may also be provided by an external device.

Figure 28:
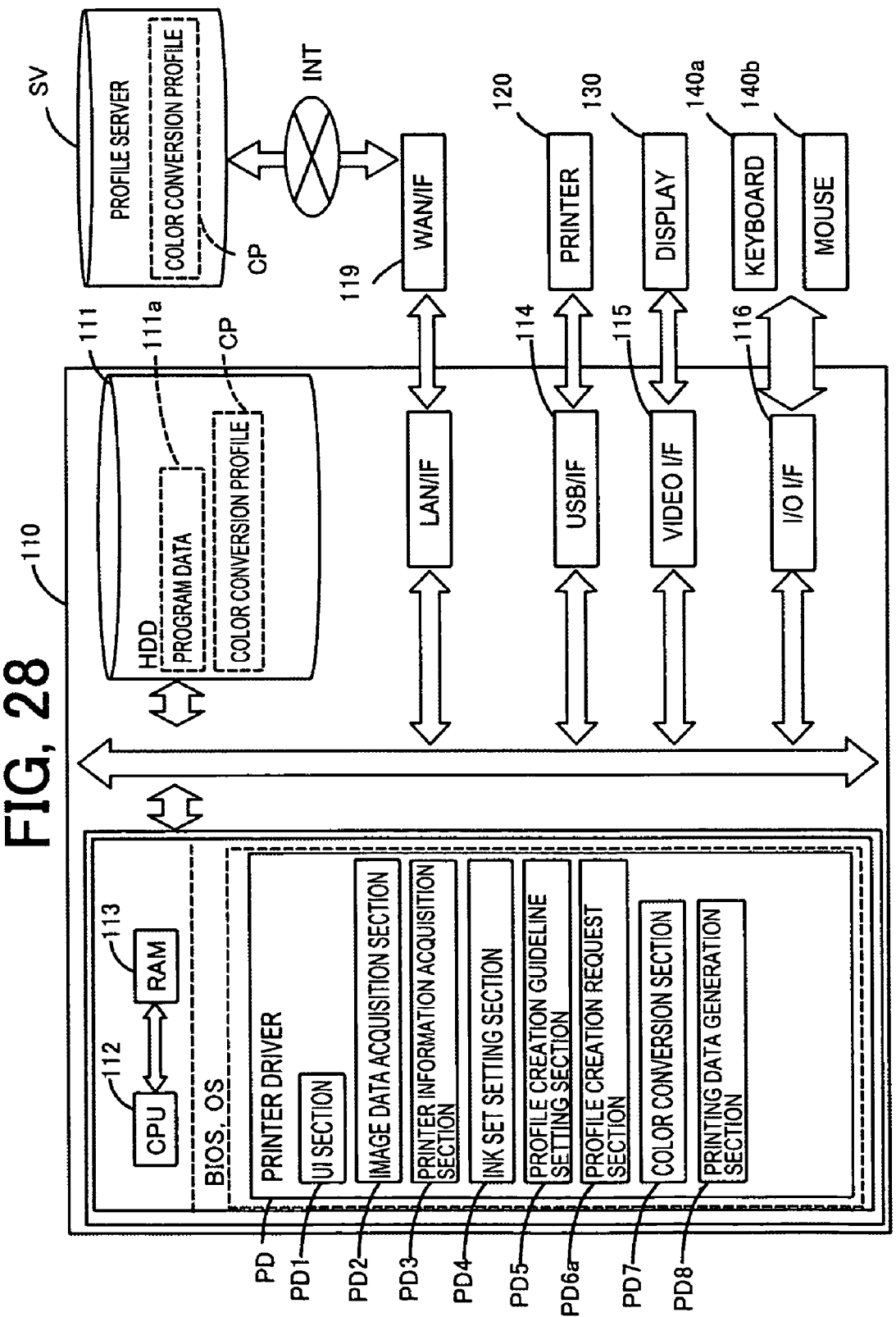
FIG. 28 is a block diagram which shows the constitution of a printing control device according to the modified example.

FIG. 28 shows the constitution of the printing control device according to a modified example. As shown in FIG. 28, a WAN interface (I/F) 119 is connected to a computer 100 which basically has the same constitution as that of the computer 10 of the above embodiment. Further, a profile request section PD6a is provided in place of the profile creation section PD6 which the printer driver PD of the above embodiment comprises. The profile request section PD6a transmits the ink set, print paper, observation light source acquired in step S130 and the weighting coefficients $w_1$ to $w_5$ set by the profile creation guideline setting section PD5 in step S210 to the profile server SV which is connected via the WAN I/F 119 and the Internet INT and issues a request to the profile server SV to create the color conversion profile CP.

The same processing as the processing executed by the computer 10 of this embodiment is performed by the profile server SV in step S300 and a color conversion profile CP which corresponds with the request of the profile request section PD6a is created. Further, in step S420, the color conversion section PD7 receives a color conversion profile CP from the profile server SV and uses the color conversion profile CP thus received in the color conversion in step S430. Thus, if the creation of the color conversion profile CP is executed by the profile server SV provided by the manufacturing source of the printer 20, for example, the various converters RC, GC, CII for creating the color conversion profile CP can also be omitted from a general household computer 100. Furthermore, the manufacturing source of the printer 20 is able to perform maintenance or an update on the various converters RC, GC, CII and management is straightforward.

In addition, billing may also be carried out when the profile server SV creates the color conversion profile CP. For example, the color conversion profile CP may also be installed free of charge at the same time as the installation of the printer driver PD for a standard ink set or billing may be carried out only in cases where the user customizes the ink set. Because the user is able to customize the ink set including the weighting coefficients $w_1$ to $w_5$, the user is able to enjoy picture creation with a high degree of additional value and originality by purchasing a color conversion profile CP. Furthermore, users may also be able to transmit color conversion profiles CP over the Internet INT in order to be able to exchange their preferred ink sets and color conversion profiles CP. The computer 100 is able to complete printing control only through processing with a relatively small processing load because the creation of a color conversion profile CP is not carried out.

FIG. 29 shows the constitution of the printer which executes the request of the color conversion profile CP. Generally, a printer 220 of limited processing power cannot comprise large CPU, RAM, and HDD with a high processing speed and a large storage capacity and it is therefore difficult to create the color conversion profile CP by means of the printer 220. However, if a request for a color conversion profile CP is sent to the profile server SV, printing which corresponds with an optional ink set can also be implemented by the printer 220. Naturally, in cases where the printer 220 possesses the adequate CPU, RAM, and ROM performance and so forth, the color conversion profile CP may also be created by the printer 220.

Moreover, although ink cartridges 22, 22 . . . in which all of the inks are separate are illustrated in the above embodiment, the present invention can be applied only by ink cartridges of the aggregate type which contain ink of a plurality of types. Suppose that the printer were a printer in which only ink cartridges of the aggregate type can be installed, because the user may restrict the inks which are used therein, the user is most certainly able to designate an optional ink set. In addition, although a printer which performs printing by using only inks containing color materials which contribute to the form of the spectral reflectivity R (λ) was illustrated hereinabove, a gloss optimizer for adding gloss to the printed matter can also be used at the same time. The amount of ink of the gloss optimizer does not contribute to the form of the spectral reflectivity R (λ) and is therefore not a target of the optimization of step S340 and the amount of ink of the gloss optimizer may ultimately be determined on the basis of the optimized ink amounts of the other inks.

What is claimed is:

1. A printing control device which performs printing control for printing by using color materials of a plurality of types, comprising:
    an acquiring unit that acquires a color material set which is a combination of the color materials used for printing; and
    a creation unit that creates a color conversion profile which prescribes conversion rules for converting image data expressed by a first color space into image data expressed by a second color space which differs from the first color space and which is a color space expressed by a color material amount set which is a combination of usage amounts for the respective color materials constituting the color material set,
    wherein the acquiring unit includes:
    a request receiving unit that receives a request for a predetermined print performance; and
    a selecting unit that estimates the print performance when printing is performed by using respective color material sets which are constituted by using the combination of color materials and for selecting the color material set which satisfies the request on the basis of the estimate, and
    wherein the selecting unit acquires the selected color material set.

2. The printing control device according to claim 1, wherein the selecting unit receives restrictions for the color material set used for printing and selects the color material set within these restrictions.

3. The printing control device according to claim 1, wherein the selecting unit further comprises:
    a reporting unit that reports the color material set which satisfies the request.

4. The printing control device according to claim 3, wherein
    the request receiving unit receives notice of the fact that a predetermined color reproduction gamut is to be secured as the request; and
    the selecting unit selects the color material set which satisfies the request on the basis of color reproduction gamut data which hold information on the color reproduction gamut in cases where printing is performed by using respective color material sets which can be used by the printing device.

5. The printing control device according to claim 4, wherein the request receiving unit receives notice of the fact that a color reproduction gamut in which all of the colors represented by the image data of a print target are included is to be secured as the request.

6. The printing control device according to claim 1, further comprising:
    a warning unit that issues a warning in cases where the request cannot be satisfied by any of the color material sets which can be used by the printing device.

7. The printing control device according to claim 1, wherein it is confirmed whether the color conversion profile created by the creation unit satisfies the request.

8. The printing control device according to claim 1, wherein the request receiving unit receives notice of the fact that graininess is to be suppressed as the request; and
    the selecting unit selects the color material set which satisfies the request on the basis of a pre-prepared graininess estimate model.

9. The printing control device according to claim 8, wherein the request receiving unit receives notice of the fact that graininess of a designated target color is to be suppressed as the request.

10. The printing control device according to claim 9, wherein the target color is acquired on the basis of a color indicated by a designated color value, a color indicated by a designated color patch, or a color indicated by an area which is designated by a displayed image.

11. The printing control device according to claim 10, wherein the selecting unit specifies the color material amount sets with which the target color can be reproduced on the basis of a color estimate model, specifies the color material amount set with which the graininess is suppressed the most from among the specified color material amount sets on the basis of the graininess estimate model, and selects the color material set with which the specified color material amount set can be provided.

12. The printing control device according to claim 10, wherein the selecting unit specifies the color material amount set with which the evaluation index for evaluating at least a degree of proximity to the target color and a degree of graininess suppression is the most favorable and selects the color material set with which the specified color material amount set can be provided.

13. A printing control device which performs printing control for printing by using color materials of a plurality of types, comprising:
    acquiring unit that acquires a color material set which is a combination of the color materials used for printing;
    request unit that issues a request to an external device connected via a communication line to create a color conversion profile which prescribes conversion rules for converting image data of a print target into image data of a color material amount set which is a combination of color material amounts of the respective color materials constituting the color material set; and
    color conversion unit that converts the image data of the print target into the image data of the color material amount set by receiving and using the color conversion profile thus created by the external device.

14. A printing control method of performing printing control for printing by using color materials of a plurality of types, comprising:
    acquiring a color material set which is a combination of the color materials used for printing; and
    creating a color conversion profile which prescribes conversion rules for converting image data expressed by a first color space into image data expressed by a second color space which differs from the first color space and which is a color space expressed by a color material amount set which is a combination of usage amounts for the respective color materials constituting the color material set, wherein the acquiring of the color material set includes:

receiving a request for a predetermined print performance;

estimating the print performance when printing is performed by using respective color material sets which are constituted by using the combination of color materials;

selecting the color material set which satisfies the request on the basis of the estimate, and acquiring the selected color material set.

15. A printing control program stored in a non-transitory computer-readable medium, the printing control program allowing a computer to execute printing control for printing by using color materials of a plurality of types, the printing control program comprising:

an acquisition program code for acquiring information specifying a color material set which is a combination of the color materials used for printing; and a creation program code for creating a color conversion profile which prescribes conversion rules for converting image data expressed by a first color space into image data expressed by a second color space which differs from the first color space and which is a color space expressed by a color material amount set which is a combination of usage amounts for the respective color materials constituting the color material set, wherein the acquisition program code includes:

program code for receiving a request for a predetermined print performance;

program code for estimating the print performance when printing is performed using respective color material sets which are constituted by using the combination of color materials;

program code for selecting the color material set which satisfies the request on the basis of the estimate; and program code for acquiring the selected color material set.

* * * * *